United States Patent
Chen et al.

(10) Patent No.: US 10,595,280 B2
(45) Date of Patent: Mar. 17, 2020

(54) REPETITION LEVEL COVERAGE ENHANCEMENT TECHNIQUES FOR PHYSICAL RANDOM ACCESS CHANNEL TRANSMISSIONS

(71) Applicant: QUALCOMM Incorporated, San Diego, CA (US)

(72) Inventors: Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 289 days.

(21) Appl. No.: 15/059,075

(22) Filed: Mar. 2, 2016

(65) Prior Publication Data

US 2016/0262109 A1 Sep. 8, 2016

Related U.S. Application Data

(60) Provisional application No. 62/129,673, filed on Mar. 6, 2015.

(51) Int. Cl.
*H04W 52/22* (2009.01)
*H04W 52/14* (2009.01)
(Continued)

(52) U.S. Cl.
CPC ............ *H04W 52/22* (2013.01); *H04W 4/70* (2018.02); *H04W 52/146* (2013.01); *H04W 74/006* (2013.01); *H04W 74/0833* (2013.01)

(58) Field of Classification Search
CPC ...... H04L 1/08; H04W 52/245; H04W 52/48; H04W 52/50; H04W 52/22;
(Continued)

(56) References Cited

U.S. PATENT DOCUMENTS 9,326,122 B2 * 4/2016 Xiong .................. H04W 8/005
9,743,426 B2 * 8/2017 Lim .................... H04W 74/006
(Continued)

FOREIGN PATENT DOCUMENTS

EP 3091811 A1 11/2016

OTHER PUBLICATIONS

Huawei, "LS on PRACH Coverage Enhancement," 3GPP TSG RAN WG1 Meeting #80, Athens, Greece, R1-150880, Feb. 9-13, 2015, 2 pgs., XP_50934049A, 3rd Generation Partnership Project.
(Continued)

*Primary Examiner* — Oussama Roudani
(74) *Attorney, Agent, or Firm* — Holland & Hart LLP

(57) ABSTRACT

Methods, systems, and devices are described for transmit power control and repetition levels of random access requests in a wireless communications network. Power settings and repetition levels for random access request transmissions may account for, and/or be based on prior power settings or prior uplink channel repetition levels. Power settings may also be based on other factors, including a power ramp-up associated with current or prior random access procedures. Power settings may be computed by a user equipment (UE) or they may be indicated to a UE from another system node. The described features may be implemented as coverage enhancement techniques, for example, for devices employing Machine Type Communication (MTC).

20 Claims, 11 Drawing Sheets

(51) Int. Cl.
H04W 4/70 (2018.01)
H04W 74/00 (2009.01)
H04W 74/08 (2009.01)

(58) Field of Classification Search
CPC . H04W 52/146; H04W 4/005; H04W 52/221;
H04W 52/362; H04W 52/367; H04W
74/006; H04W 52/14; H04W 74/08;
H04W 52/24; H04W 52/36; H04W 74/00
See application file for complete search history.

(56) References Cited

U.S. PATENT DOCUMENTS

| | | | | |
|---|---|---|---|---|
| 9,794,961 | B2* | 10/2017 | Wu | H04W 74/0891 |
| 9,900,786 | B2* | 2/2018 | Xiong | H04W 16/26 |
| 2015/0016312 | A1 | 1/2015 | Li et al. | |
| 2016/0255591 | A1* | 9/2016 | Park | H04W 4/70 455/522 |
| 2016/0353440 | A1* | 12/2016 | Lee | H04W 4/70 |

OTHER PUBLICATIONS

ISA/EP, International Search Report and Written Opinion of the International Searching Authority, Int'l. App. No. PCT/US2016/020970, dated May 13, 2016, European Patent Office, Rijswijk, NL, 13 pgs.
Taiwan Search Report—TW105106574—TIPO—dated Oct. 23, 2019 (152337TW).
Ericsson: "Remaining Random Access Issues for BL UEs and UEs in EC", R2-161693, 3GPP TSG-RAN WG2 #93, St. Julian's, Malta, Feb. 15-19, 2016, Feb. 6, 2016, 6 Pages, URL: http://www.3gpp.org/ftp/tsg_ran/WG2_RL2/TSGR2_93/Docs/R2-161693.zip.
Huawei et al., "Further NB-IoT Random Access Physical Layer Aspects", R1-160035, 3GPP TSG RAN WG1 adhoc_LTE_NB-IoT_1601, Budapest, Hungary, Jan. 18-20, 2016, Jan. 12, 2016,3 Pages, URL:http://www.3gpp.org/ftp/tsg_ran/WG1_RL1/TSGR1_AH/LTE_NB-IoT_1601/Docs/R1-160035.zip . . . .
Huawei et al., "On Transmit Power and Power Ramping for PRACH in Coverage Enhancement", R1-153764, 3GPP TSG RAN WG1 Meeting #82, Beijing, China, Aug. 24-28, 2015, Aug. 15, 2015, 8 Pages, URL:http://www.3gpp.org/ftp/tsg_ran/WG1_RL1/TSGR1_82/Docs/R1-153764.zip . . . .
Interdigital: "PRACH Power Ramping and Power Calculation", R2-161652, 3GPP TSG-RAN WG2 #93, St. Julian's, Malta Feb. 15-19, 2016, Feb. 6, 2016, 4 Pages, URL:http://www.3gpp.org/ftp/tsg_ran/WG2_RL2/TSGR2_93/Docs/R2-161652.zip.
Motorola Mobility: "Introduction of further LTE Physical Layer Enhancements for MTC", RP-152126, 3GPP TSG-RAN Meeting #70, Stiges, Spain, Dec. 7-10, 2015, Dec. 10, 2015, p. 42, 3 Pages, URL:http://www.3gpp.org/ftp/tsg_ran/TSG_RAN/TSGR_70/Docs/RP-152126.zip.

* cited by examiner

REPETITION LEVEL COVERAGE ENHANCEMENT TECHNIQUES FOR PHYSICAL RANDOM ACCESS CHANNEL TRANSMISSIONS

CROSS REFERENCES

The present application for patent claims priority to U.S. Provisional Patent Application No. 62/129,673 by Chen et al., entitled "Coverage Enhancement Techniques For Physical Random Access Channel Transmissions," filed Mar. 6, 2015, assigned to the assignee hereof, and expressly incorporated by reference herein.

BACKGROUND

Field of Disclosure

The following relates generally to wireless communication, and more specifically to repetition level coverage enhancement techniques for random access request transmissions.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system).

By way of example, a wireless multiple-access communications system may include a number of base stations, each simultaneously supporting communication for multiple communication devices, which may each be referred to as a user equipment (UE). A base station may communicate with the communication devices on downlink channels (e.g., for transmissions from a base station to a UE) and uplink channels (e.g., for transmissions from a UE to a base station).

Some types of wireless communication devices may provide for automated communication. Automated wireless communication devices may include those implementing Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices that integrate sensors or meters to measure or capture information and relay that information to a central server or an application program that can make use of the information, or present the information to humans interacting with the program or application.

MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some wireless communications systems, it may be desirable to enhance coverage (e.g., for fixed-location MTC devices) to improve the system capabilities and robustness. One coverage enhancement technique includes repeating transmissions over an increment of time until a positive acknowledgement is received from a target device in response to the transmissions. However, challenges are present in balancing system coverage and reliability with power consumption and use of system resources.

SUMMARY

The described features generally relate to one or more systems, methods, and apparatuses for coverage enhancement techniques for random access request transmissions in a wireless communications network. For example, uplink transmit power settings for transmissions over a physical random access channel may account for, or be based on, uplink channel repetition levels. Additionally or alternatively, transmit power settings may be based on other factors, including a power ramp-up associated with prior uplink channel transmissions, and/or channel conditions determined for a radio frequency spectrum band.

A method of communication at a wireless communications device is described. The method may include identifying a first repetition level from a plurality of repetition levels for a first random access request sequence of a random access request procedure, determining, based at least in part on the first repetition level, one or more transmission power parameters for one or more random access requests of the first random access request sequence, and transmitting the one or more random access requests of the first random access request sequence according to the one or more transmission power parameters.

An apparatus for communication at a wireless communications device is described. The apparatus may include means for identifying a first repetition level from a plurality of repetition levels for a first random access request sequence of a random access request procedure, means for determining, based at least in part on the first repetition level, one or more transmission power parameters for one or more random access requests of the first random access request sequence, and means for transmitting the one or more random access requests of the first random access request sequence according to the one or more transmission power parameters.

An apparatus for communication at a wireless communications device is described. The apparatus may include a processor, memory in electronic communication with the processor, and instructions stored in the memory. The instructions may be executable by the processor to cause the wireless communications device to identify a first repetition level from a plurality of repetition levels for a first random access request sequence of a random access request procedure, determine, based at least in part on the first repetition level, one or more transmission power parameters for one or more random access requests of the first random access request sequence, and transmit the one or more random access requests of the first random access request sequence according to the one or more transmission power parameters.

A non-transitory computer-readable medium storing code for wireless communications is described. The code may include instructions executable to identify a first repetition level from a plurality of repetition levels for a first random access request sequence of a random access request procedure, determine, based at least in part on the first repetition level, one or more transmission power parameters for one or more random access requests of the first random access request sequence, and transmit the one or more random access requests of the first random access request sequence according to the one or more transmission power parameters.

Some examples of the method, apparatuses, or non-transitory computer-readable medium may include steps, means, features, or instructions for determining channel conditions based at least in part on a signal received at the wireless communications device. In some examples of the method, apparatuses, or non-transitory computer-readable medium, identifying the first repetition level for the first random access request sequence may be based on the determined channel conditions. In some examples of the method, apparatuses, or non-transitory computer-readable medium, determining the one or more transmission power parameters may be based the determined channel conditions.

In some examples of the method, apparatuses, or non-transitory computer-readable medium determining the one or more transmission power parameters may include determining at least one of an initial transmit power or a transmit power step size for the first random access request sequence. In some examples, determining the one or more transmission power parameters may include determining at least one of an initial transmit power equal to a maximum transmit power, or a transmit power step size equal to zero.

Some examples of the method, apparatuses, or non-transitory computer-readable medium may include steps, means, features, or instructions for identifying a maximum number of random access requests to be transmitted in the first random access request sequence based on the determined one or more transmission power parameters and a maximum uplink transmit power, and performing the first random access request sequence based at least in part on the identified maximum number of random access requests.

A method of communication at a wireless communications device is described. The method may include identifying a repetition level for a random access request sequence and determining one or more transmission power parameters for the random access request sequence based on an transmit power of a previous random access request sequence at a previous repetition level.

An apparatus for communication at a wireless communications device is described. The apparatus may include means for identifying a repetition level for a random access request sequence and means for determining one or more transmission power parameters for the random access request sequence based at least in part on an transmit power of a previous random access request sequence at a previous repetition level.

An apparatus for communication at a wireless communications device is described. The apparatus may include a processor, memory in electronic communication with the processor, and instructions stored in the memory. The instructions may be executable by the processor to cause the wireless communications device to identify a repetition level for a random access request sequence and determine one or more transmission power parameters for the random access request sequence based at least in part on an transmit power of a previous random access request sequence at a previous repetition level.

A non-transitory computer-readable medium storing code for wireless communications is described. The code may include instructions executable to identify a repetition level for a random access request sequence and determine one or more transmission power parameters for the random access request sequence based at least in part on an transmit power of a previous random access request sequence at a previous repetition level.

In some examples of the method, apparatuses, or non-transitory computer-readable medium, determining the one or more transmission power parameters may be based at least in part on a comparison of the repetition level with the previous repetition level. In some examples, determining the one or more transmission power parameters may include steps, means, features, or instructions for setting an transmit power for an initial random access request of the random access request sequence to be a same value as a previous transmit power of the previous random access request sequence.

In some examples of the method, apparatuses, or non-transitory computer-readable medium determining the one or more transmission power parameters may include steps, means, features, or instructions for setting an transmit power for random access requests of the random access request sequence to be a maximum transmit power. In some examples, determining the one or more transmission power parameters may be based on determining that a number of redundant transmissions exceeds a repetition level threshold.

In some examples of the method, apparatuses, or non-transitory computer-readable medium, a number of redundant transmissions of the repetition level may be greater than a number of redundant transmissions of the previous repetition level. In some examples of the method, apparatuses, or non-transitory computer-readable medium, a last transmit power of a last random access request of the previous random access request sequence may be greater than an initial transmit power for an initial random access request of the random access request sequence.

In some examples of the method, apparatuses, or non-transitory computer-readable medium, determining the one or more transmission power parameters may be based on channel conditions determined from a signal received by the wireless communications device. In some examples of the method, apparatuses, or non-transitory computer-readable medium, a resource set for redundant transmissions for each of two or more repeated random access requests of the random access request sequence may be determined based on the repetition level.

A method of communication at a wireless communications device is described. The method may include receiving a configuration message indicating one or more transmission power parameters associated with random access procedures, identifying a first repetition level for a first random access request sequence of a random access request procedure, and determining a first transmit power for an initial random access request of the first random access request sequence based at least in part on the identified first repetition level and the one or more transmission power parameters.

An apparatus for communication at a wireless communications device is described. The apparatus may include means for receiving a configuration message indicating one or more transmission power parameters associated with random access procedures, means for identifying a first repetition level for a first random access request sequence of a random access request procedure, and means for determining a first transmit power for an initial random access request of the first random access request sequence based at least in part on the identified first repetition level and the one or more transmission power parameters.

An apparatus for communication at a wireless communications device is described. The apparatus may include a processor, memory in electronic communication with the processor, and instructions stored in the memory. The instructions may executable by the processor to cause the wireless communications device to receive a configuration message indicating one or more transmission power parameters associated with random access procedures, identify a first repetition level for a first random access request sequence of a random access request procedure, and determine a first transmit power for an initial random access request of the first random access request sequence based at least in part on the identified first repetition level and the one or more transmission power parameters.

A non-transitory computer-readable medium storing code for wireless communications is described. The code may include instructions executable to receive a configuration message indicating one or more transmission power parameters associated with random access procedures, identify a first repetition level for a first random access request sequence of a random access request procedure, and determine a first transmit power for an initial random access request of the first random access request sequence based at least in part on the identified first repetition level and the one or more transmission power parameters.

In some examples of the method, apparatuses, or non-transitory computer-readable medium, the one or more transmission power parameters may include an initial transmit power for one or more repetition levels, a transmit power step size for the one or more repetition levels, or any combination thereof.

Some examples of the method, apparatuses, or non-transitory computer-readable medium may include steps, means, features, or instructions for determining a second transmit power for a subsequent random access request of the first random access request sequence based on a transmit power step size of the one or more transmission power parameters.

In some examples of the method, apparatuses, or non-transitory computer-readable medium, the second transmit power may be determined to be a maximum transmit power.

Some examples of the method, apparatuses, or non-transitory computer-readable medium may include steps, means, features, or instructions for identifying a second repetition level for a second random access request sequence and determining a third transmit power for an initial random access request of the second random access request sequence based on at least one of a last transmit power of the first random access request sequence or the one or more transmission power parameters.

In some examples of the method, apparatuses, or non-transitory computer-readable medium, determining the third transmit power may include setting the third transmit power to be equal to a last transmit power of a last random access request of the first random access request sequence. In some examples, the third transmit power may be determined to be a maximum transmit power.

Some examples of the method, apparatuses, or non-transitory computer-readable medium may include steps, means, features, or instructions for determining channel conditions based on a signal received by the wireless communications device, and determining the third transmit power based at least in part on the determined channel conditions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
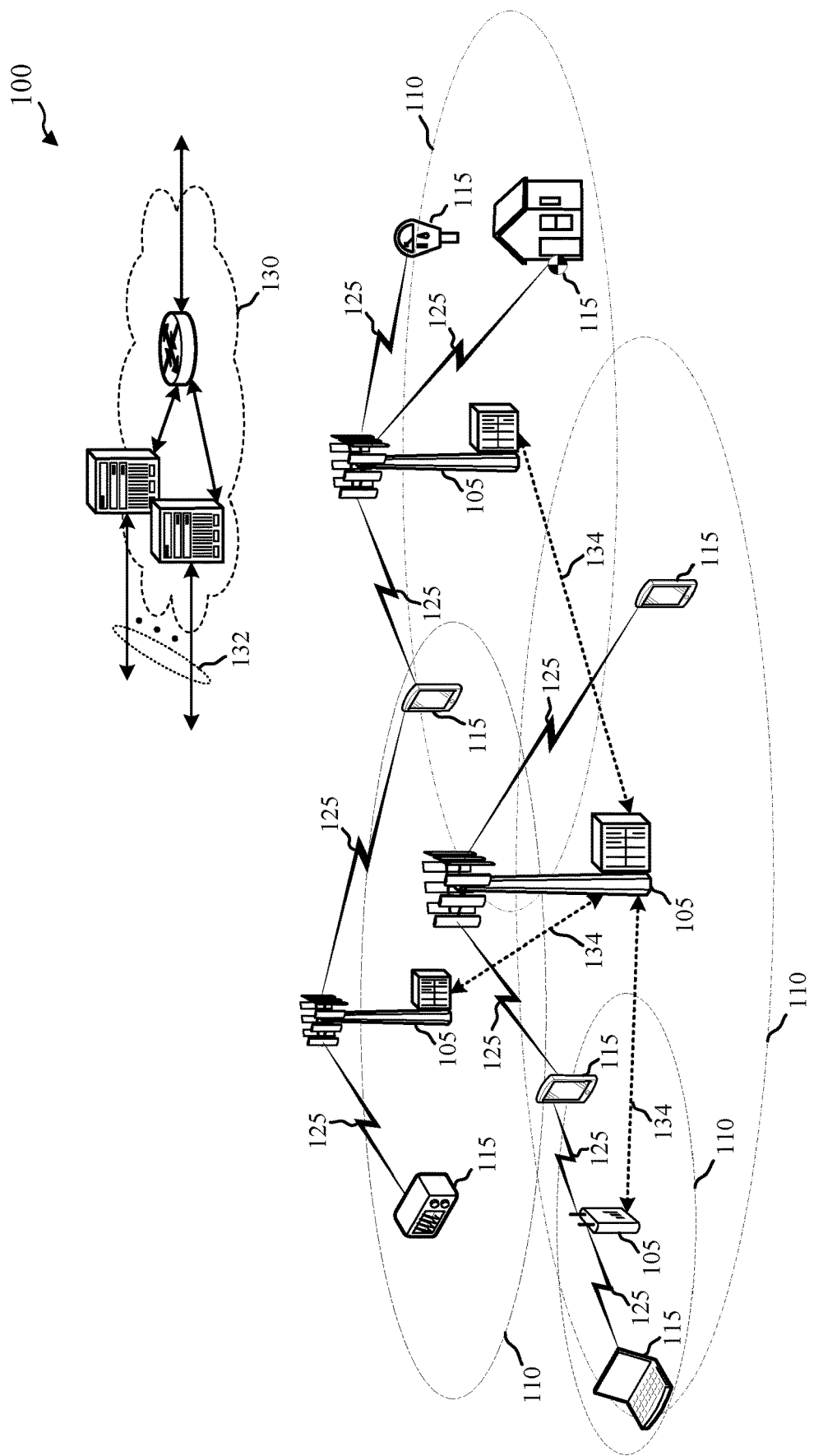
FIG. 1 illustrates an example of a wireless communications system in which repetition level coverage enhancement techniques may be employed, in accordance with aspects of the present disclosure.

The described features generally relate to improved systems, methods, or apparatuses for coverage enhancement techniques for a physical random access channel in a wireless communications network. In some examples a wireless communications network may employ automated communication such as Machine Type Communication (MTC) or Machine-to-Machine (M2M) communications, whereby such communications may be provided without human intervention. In some cases, MTC devices may have limited capabilities. For example, while some MTC devices may have broadband capacity, other MTC devices may be limited to narrowband communications. A narrowband limitation may, for example, interfere with an ability of an MTC device to receive control channel information using the full radio frequency spectrum bandwidth employed by a serving base station. In some wireless communication systems, such those employing protocols based on Long Term Evolution (LTE) technologies, an MTC device having limited bandwidth capability (or another device with similar capabilities) may be referred to as a category 0 device.

In some cases, MTC devices may have reduced peak data rates (e.g., a maximum transport block size may be 1000 bits). Additionally, an MTC device may have rank 1 transmission, and employ a single antenna for transmitting and receiving. This may limit an MTC device to half-duplex communications (e.g., the device may not be capable of simultaneously transmitting and receiving). If an MTC device employs half-duplex communications, the device may have a relaxed switching time (e.g., a switching time from transmission (Tx) to reception (Rx), or vice versa). For example, a nominal switching time for a non-MTC device may be 20 µs, while a nominal switching time for an MTC device may be 1 ms. Enhanced MTC (e.g., eMTC) operations in a wireless system may allow narrowband MTC devices to effectively operate within wider system bandwidth operations (e.g., 1.4 MHz, 3 MHz, 5 MHz, 10 MHz, 15 MHz, 20 MHz, etc.). For example, an MTC device may have a bandwidth limitation of 1.4 MHz bandwidth (e.g., 6 resource blocks according to certain LTE-based protocols, etc.), but communicate via one or more cells having a wider bandwidth (e.g., 3 MHz, 5 MHz, 10 MHz, 15 MHz, 20 MHz, etc.). In some instances, coverage enhancements of such eMTC devices may be employed to provide more reliable communications. Coverage enhancements may include, for example, power boosting (e.g., of up to 15 dB), and/or a bundling of transmission time intervals (TTIs) to provide redundant versions of a transmission.

Bundling of TTIs to provide a certain number of redundant versions of a transmission may be provided according to one or more repetition levels, which may include parameters stored and/or received at a device. In some examples the bundling of TTIs according to a repetition level may be used to enhance coverage for certain channels, such as a physical uplink shared channel (PUSCH), a physical downlink shared channel (PDSCH), an enhanced PDCCH (ePDCCH), a physical random access channel (PRACH), and/or a physical uplink control channel (PUCCH) (e.g., as defined by LTE-based protocols). For instance, various physical channels, including the PRACH and associated messages, may be repeatedly transmitted from a wireless communications device and different channels may have a different number of repetitions (e.g., different repetition levels). In some cases, the number of repetitions (e.g., the number of redundant transmissions, etc.) of a random access request can be on the order of tens of transmissions.

By way of example, random access repetition may include a repetition level ramp-up, up to a specified maximum repetition level (e.g., a maximum number of repetitions). For instance, various coverage enhancement techniques may include three repetition levels, in addition to a "zero coverage extension" level. Thus, a system may use a configurable number of repetition levels up to the maximum level. Each repetition level may be associated with a number of repetitions (e.g., a number of transmissions of a random access request), which may be configurable and/or may include ranges. For example, a UE may request access to establish a communications link with a base station by successively transmitting over a PRACH according to configurations at different repetition levels. One or more random access requests may be made at each repetition level, and each random access request may include a single transmission (e.g., a single PRACH preamble transmission), or may include multiple redundant transmissions (e.g., multiple repetitions of the same PRACH preamble according to the same transmission configuration). As used herein, the random access requests at a particular repetition level may be referred to as a random access request sequence. For example, three random access requests may be made at a first repetition level in a first random access request sequence, followed by five random access requests (assuming no random access response is received) made at a second repetition level in a second random access request sequence.

In an example, a random access request procedure (e.g., a PRACH procedure) may include three repetition levels (in addition to a zero-repetition level, in some examples), and the repetition levels one, two, and three, for example, may respectively allow for five, ten, and fifteen repetitions each. According to this example, a wireless communications device may begin a random access request procedure according to a configuration associated with repetition level one, including repeating transmission of a PRACH preamble five times (e.g., five redundant transmissions) for each random access request in a first random access request sequence. If the device does not receive a random access response while performing the random access requests according to the first repetition level (e.g., a number of random access requests configured for the first repetition level, etc.), the device may transition to repetition level two and initiate a second random access request sequence. During the second random access request sequence, the device may repeat transmission of a PRACH preamble ten times for each random access request in the second random access request sequence. If the device does not receive a random access response while performing the random access requests according to the second repetition level, the device may subsequently transition to repetition level three and initiate a third random access request sequence. During the third random access request sequence, the device may repeat transmission of a PRACH preamble fifteen times for each random access request in the third random access request sequence.

In some cases, the device may increase a transmit power with each successive repetition level, or within a repetition level, which may be referred to as transmit power ramp-up. A device may transmit random access requests at an initial transmit power in repetition level one, a higher transmit power at repetition level two, and a still higher transmit power at repetition level three. In some embodiments, a device may increase transmit power with each random access request, such that each successive PRACH preamble (and any redundant transmissions thereof) is transmitted at a higher power than the previous random access request (and any redundant transmissions thereof), until a maximum transmit power (e.g., a maximum transmit power for the UE 115-c, a maximum transmit power associated with random access requests, etc.) is reached, or a maximum configured number of random access requests associated with the repetition level is reached. The overall number of random access requests a device makes in a random access request procedure, and/or the total number of random access requests allowed, may vary.

In various examples, an initial transmit power, an amount of power ramp-up, a number of random access requests, and/or a number of redundant transmissions for random access requests may be considered as portions of a resource set of a repetition level. Successive repetition levels may have a uniform increase in aspects of a resource set available for PRACH transmissions. In some examples an increase in resource set may be allocated between a change in initial transmit power, a change in an amount of power ramp-up, a change in a number of random access requests, and/or a change in a number of redundant transmissions. The allocation of resources in the resource set may be based on an initial transmit power, a last transmit power or a number of repetitions of a previous repetition level, channel conditions, and the like. Furthermore, in some examples, transmit power may be increased for successive random access requests within a repetition level.

In some examples a transmit power for random access requests may be set to a maximum transmit power if the number of redundant transmissions of a repetition level exceeds a threshold associated with the repetition level. For example, a network configuration may be associated with five, ten, and fifteen repetitions for a first, second, and third repetition level, respectively, and the network configuration may associate a maximum transmit power with the third repetition level. A UE, on the other hand, may be configured to use a maximum transmit power whenever a repetition level is associated with 8 or more repetitions. Thus, according to the present example, a UE may transmit random access requests at the maximum transmit power at both the second and the third repetition level, despite the network configuration only being associated with the maximum transmit power at the third repetition level. In some examples a device may be limited to an overall maximum number of random access requests before reaching a backoff setting. Additionally or alternatively, the device may be configurable to repeat a progression through random access repetition levels (e.g., in a subsequent random access request procedure, etc.) until receiving a random access response.

Although repetition level coverage enhancement techniques, including channel repetition, repetition level ramp-up, and transmit power ramp-up, may be employed with MTC devices, other types of devices may likewise utilize or benefit from such techniques. Accordingly, those skilled in the art will recognize that the described repetition level coverage enhancement techniques are not limited to MTC applications.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For example, although the scenarios are described with respect to MTC devices, the techniques described herein may be used with a variety of other type wireless communications devices and systems. In addition, the methods described may be performed in an order different from that described, and various steps may be added, omitted, or combined. Also, features described with respect to some examples may be combined in other examples.

FIG. 1 illustrates an example of a wireless communications system 100 in which repetition level coverage enhancement techniques may be employed, in accordance with aspects of the present disclosure. The wireless communications system 100 includes base stations 105, at least one user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links. A UE may be an MTC device described above.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. As noted above, a UE may be an MTC device, although the techniques described herein may be used by a variety of UEs. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

Some types of UEs may provide for automated communication. Automated wireless communications devices may include those implementing MTC or M2M communication. MTC may refer to data communication technologies that allow devices to communicate with one another or a base station without human intervention. For example, MTC may refer to communications from devices that integrate sensors or meters to measure or capture information and relay that information to a central server or application program that can make use of the information or present the information to humans interacting with the program or application. As noted, some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving mode (e.g., "deep sleep" mode, etc.) when not engaging in active communications. In some cases, MTC devices may be configured for regular transmission intervals that alternate with power saving mode intervals.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the UL transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the wireless communications system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more UL CCs for carrier aggregation. Carrier aggregation may be used with both FDD and TDD component carriers.

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

Time intervals in LTE may be expressed in multiples of a basic time unit (e.g., the sampling period, Ts=1/30,720,000 seconds). Time resources may be organized according to radio frames of length of 10 ms (Tf=307200·Ts), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

Data may be divided into logical channels, transport channels, and physical layer channels. Channels may also be classified into control channels and traffic channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, dedicated traffic channel (DTCH) for dedicated UE data, and multicast traffic channel (MTCH), for multicast data. DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and UL shared channel (UL-SCH) for data. DL physical channels may include physical broadcast channel (PBCH) for broadcast information, physical control format indicator channel (PCFICH) for control format information, physical downlink control channel (PDCCH) for control and scheduling information, physical HARQ indicator channel (PHICH) for HARQ status messages, physical downlink shared channel (PDSCH) for user data and physical multicast channel (PMCH) for multicast data. UL physical channels may include physical random access channel (PRACH) for access messages, PUCCH for control data, and physical UL shared channel (PUSCH) for user data.

In some cases a TTI (e.g., 1 ms, equivalent to one subframe according to LTE-based protocols, etc.) may be defined as the smallest unit of time in which a base station 105 may schedule a UE 115 for UL or DL transmission. For example, if a UE 115 is receiving DL data, then during each 1 ms interval a base station 105 may assign resources and indicate (via PDCCH transmissions) to the UE 115 where to decode DL data intended for the UE 115. In some examples TTI bundling may be used to improve a communication link 125 in relatively poor radio conditions or in deployments where MTC devices may operate using a relatively narrow bandwidth or are in a coverage limited locations, such as a basement or deep within a building. TTI bundling may include sending multiple redundant copies of the same information in a group of consecutive or non-consecutive subframes (TTIs) rather than waiting for feedback indicating data was not received before transmitting redundant copies.

According to aspects of the present disclosure, a wireless communications device, such as a UE 115, may be configured to perform a random access request procedure according to one or more repetition levels. The repetition levels may each be associated with a number of random access requests and/or a number of redundant transmissions for each random access request. While performing a random access request procedure according to a repetition level configuration, a device may determine one or more transmission power parameters for transmitting random access requests, such as an initial transmit power for the repetition level, a transmit power step size for the repetition level, and/or a maximum transmit power for the repetition level (e.g., a maximum uplink transmit power for the device, a maximum transmit power associated with random access requests, etc.). The transmission power parameters may be received from another device (e.g., a base station) by way of a configuration message, stored locally at the device, and/or determined at the device based on configuration parameters and/or measured channel characteristics. The device may perform the random access request procedure by transmitting random access requests according to the determined transmission power parameters at one or more repetition levels, until a random access response is received.

Figure 2:
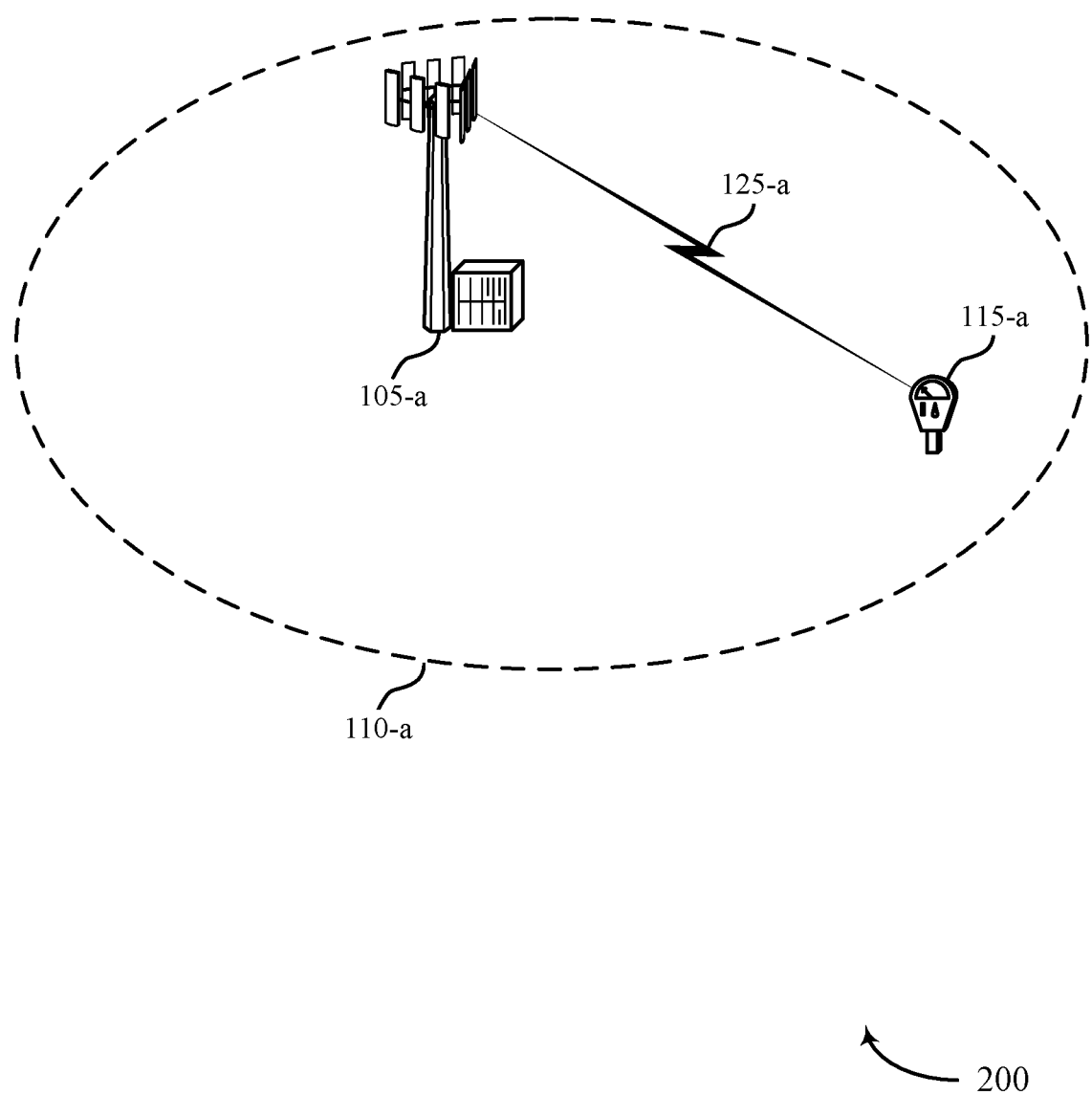
FIG. 2 illustrates an example of a wireless communications subsystem in which repetition level coverage enhancement techniques may be employed, in accordance with aspects of the present disclosure.

FIG. 2 illustrates an example of a wireless communications subsystem 200 in which repetition level coverage enhancement techniques may be employed, in accordance with aspects of the present disclosure. Wireless communications subsystem 200 may include a UE 115-a, which may be an example of a UE 115 described with reference to FIG. 1. In some examples the UE 115-a may be an MTC device. Wireless communications subsystem 200 may also include a base station 105-a, which may be an example of a base station 105 described above with reference to FIG. 1. Base station 105-a may transmit control information and/or data to any UE 115 within its geographic coverage area 110-a via a communication link 125-a. For example, communication link 125-a may allow for bidirectional communication between a UE 115-a and a base station 105-a.

Wireless communications subsystem 200 may include UEs 115 with different capabilities and different communication environments. For example, UE 115-a may have relatively diminished radio capacity when compared to other UEs 115 (not shown) that are also served by the base station. For example diminished radio capacity at the UE 115-a may be a result of a farther location, or a location of the UE 115-a having degraded radio propagation conditions, etc. Thus the UE 115-a may benefit from a coverage enhancement level which differs from a coverage enhancement level that would be used if UE 115-a were located relatively close to base station 105-a, for example.

In some examples the communication link 125-a may be established between the UE 115-a and the base station 105-a by way of a random access request procedure transmitted via a PRACH. For example, UE 115-a may initiate a random access request procedure when transitioning from a RRC idle mode to a RRC connected mode, which may coincide with a presence of data for transmission between the UE 115-a and the base station 105-a. The random access request procedure may include a sequence of data bits in a random access preamble (e.g., a PRACH preamble, which may include Zadoff-Chu (ZC) sequence according to LTE-based protocols, etc.). The random access preamble may be determined, for example, based on a root ZC sequence. In some examples, the communications link 125-a may be established between the UE 115-a and the base station 105-a based at least in part on a random access response transmitted by the base station 105-*a*, and received by the UE 115-*a*.

Figure 3:
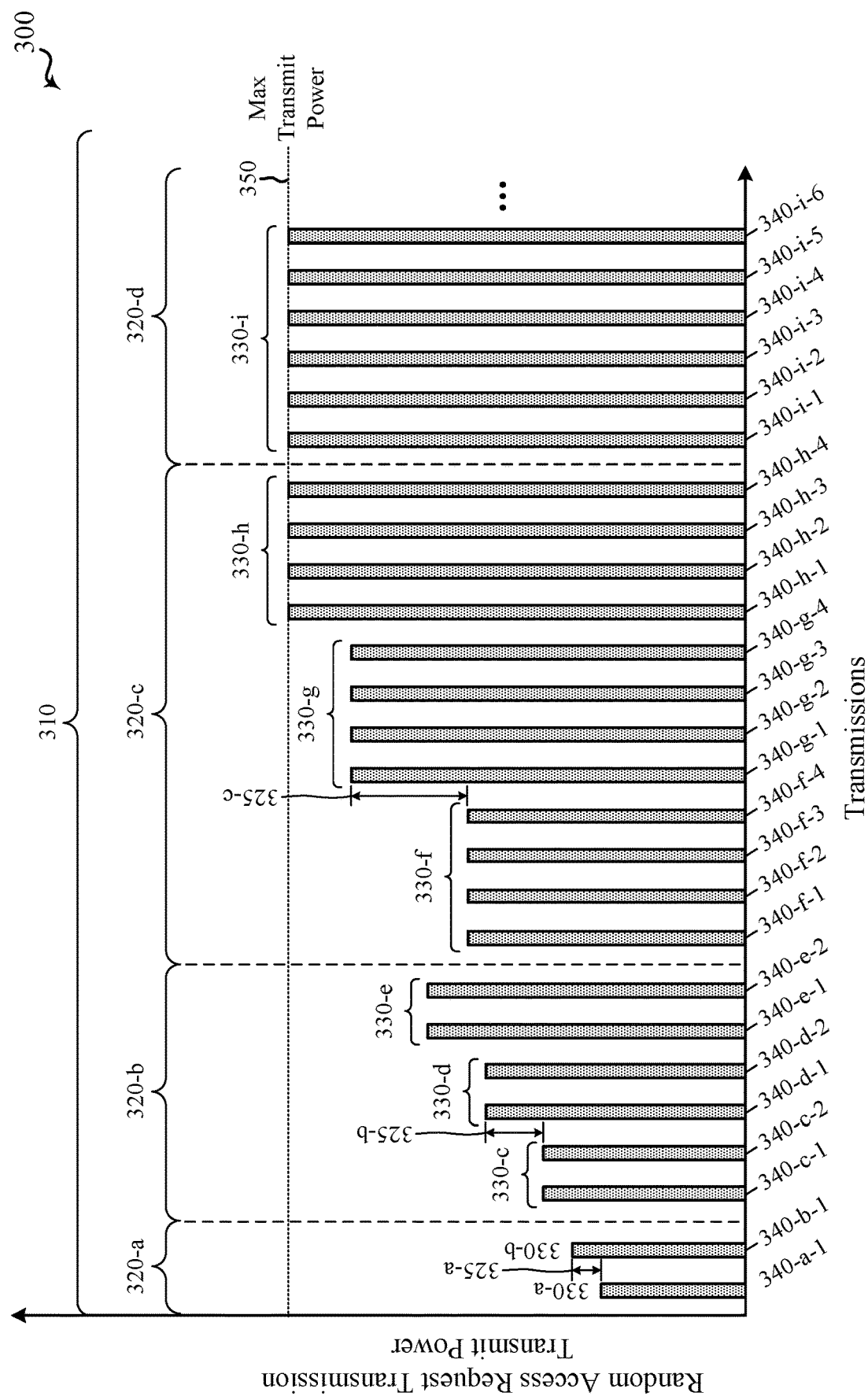
FIG. 3 is a diagram of a random access request procedure that may be performed by a UE to establish a communications link with a base station, in accordance with aspects of the present disclosure.

FIG. 3 is a diagram 300 of a random access request procedure 310 that may be performed by the UE 115-*a* to establish the communications link 125-*a* with the base station 105-*a*, in accordance with aspects of the present disclosure. A random access request procedure 310 may include one or more random access request sequences 320, which may each be performed according to a repetition level. For example, the random access request procedure 310 may include a first random access request sequence 320-*a* performed according to a first repetition level, a second random access request sequence 320-*b* performed according to a second repetition level, a third random access request sequence 320-*c* performed according to a third repetition level, and a fourth random access request sequence 320-*d* performed according to a fourth repetition level. In various examples, the UE 115-*a* may identify a number of random access requests 330 to be transmitted in each random access request sequence 320 (e.g., a maximum number of random access requests for a repetition level), and perform a random access request sequence 320 (e.g., transmission of the associated random access request transmissions 340) accordingly, until a random access response is received by the UE 115-*a*. In examples that provide bundling of PRACH transmissions, multiple redundant versions of the preamble transmission (e.g., redundant transmissions 340) may be transmitted based on a repetition level for the random access request 330. If no random access response from the base station 105-*a* is received by the UE 115-*a* in response to the random access request sequence 320, the random access procedure 310 may proceed with a higher repetition level, as described herein.

Each of the random access request transmissions 340 may be performed at a particular uplink transmit power, as shown by diagram 300. The uplink transmit power for a particular random access request transmission 340 may be determined by the UE 115-*a* from various transmission power parameters. In some examples separate transmission power parameters may be associated with respective repetition levels, and may be preconfigured for the UE 115-*a* and/or received by the UE 115-*a* in a configuration message. The uplink transmit power for random access request transmissions 340 may be further based on other parameters, such as channel conditions measured at the UE 115-*a*, a transmit power of preceding random access requests 330, and others as described herein.

The first random access request sequence 320-*a* may be performed by the UE 115-*a* according to a first repetition level, which may be identified by the UE 115-*a* as an initial repetition level for the random access request procedure 310. The first repetition level may be identified by the UE 115-*a* from a plurality of repetition levels, which in some examples may be based on selecting a lowest repetition level, selecting a repetition level based on channel conditions, selection a repetition level based on previous conditions of a communication link 125, etc. For example, channel conditions may be determined based on a reference signal received power (RSRP) measurement and/or calculation, and the RSRP may be compared to various threshold values. The threshold values may be stored at the UE 115-*a*, or signaled to the UE 115-*a* (e.g., by the base station 105-*a*, etc.) to determine a coverage enhancement level for random access requests. In various examples, a repetition level may be associated with a resource set, which may include such parameters as a number of random access requests, a number of redundant transmissions, an initial transmit power, a transmit power step size, and the like.

As shown by random access request procedure 310, the first repetition level may be associated with two random access requests 330 (e.g., random access requests 330-*a* and 330-*b*). Additionally, according to the first repetition level each of the random access requests 330-*a* and 330-*b* may be performed via a single random access request transmission 340 (e.g., random access request transmissions 340-*a*-1 and 340-*b*-1, respectively). Thus, in some examples a repetition level may be associated with random access requests 330 that do not employ redundant random access request transmissions 340 (e.g., a zero coverage extension level, a zero repetition level, etc.).

The first random access request 330-*a* of the first random access request sequence 320-*a* may be performed at a first transmit power. The first transmit power of the first random access request sequence 320-*a* may be determined based on one or more transmission power parameters associated with the first repetition level. In various examples the transmission power parameter(s) may include a configuration parameter received by the UE 115-*a* (e.g., a configuration message received by the UE 115-*a* from base station 105-*a*, etc.), and/or a configuration parameter stored at the UE 115-*a*. In some examples the transmission power parameter(s) may be based on channel conditions determined from a signal received by the UE 115-*a* (e.g., a measurement of a downlink signal, a channel condition message in a downlink signal, etc.), and or a maximum uplink transmit power of the UE 115-*a*.

The second random access request 330-*b* of the first random access request sequence 320-*a* may be performed at a second transmit power, different from the first uplink transmit power. For example, the second transmit power may be calculated by adding a transmit power step size 325-*a* to the first transmit power. The transmit power step size 325-*a* may be associated with the first repetition level, and in some examples may be included in the transmission power parameters associated with the first repetition level. In some examples the transmit power step size 325-*a* may be further based on other parameters such as radio frequency channel conditions, number of random access requests 330 of the random access request sequence 320, and the like.

If the UE 115-*a* does not receive a random access response from the base station 105-*a* in response to one or more of the transmissions 340 of the first random access request sequence 320-*a* (e.g., following random access request 330-*a* or 330-*b*), the random access request procedure 310 may proceed with a second random access request sequence 320-*b*. For example, the UE 115-*a* may identify a second repetition level, which may be associated with a coverage enhancement relative to the first repetition level. In some examples, identifying the second repetition level may be a pre-configured increment from a preceding repetition level, associated with one or more predetermined increments in a resource set. In some examples, identifying the second repetition level may be based at least in part on parameters associated with the first random access request sequence 320-*a*. For example, the second random access request sequence 320-*b* may be associated with two random access request transmissions 340 for each random access request 330 in the second random access request sequence 320-*b*, compared to a single random access request transmission 340 for each random access request 330 of the first random access request sequence 320-*a*.

In some examples, the transmission power parameters for a given repetition level may include an initial transmit power for the repetition level, which may be determined based at least in part on the given repetition level, a previous repetition level, a transmit power of the previous repetition level, or any combination thereof. Various calculations or comparisons may be made, for example, of parameters of a repetition level i with parameters of a repetition level j, in order to determine the initial transmit power for repetition level j (e.g., applying relationships such as $r_j-r_i$, $r_j/r_i$, $\log(r_j/r_i)$, etc., where $r_i$ and $r_j$ represent parameters of repetition level i and repetition level j, respectively.). For example, an initial transmit power associated with repetition level j could be determined (in dBm) as the last transmit power at repetition level i adjusted by $G_{j,i}-10 \cdot \log(RR_{j,i})$, where $G_{j,i}$ is the desired coverage enhancement step (in dB) between repetition level i and repetition level j, and $RR_{j,i}$ is the ratio of redundant transmissions between repetition level i and repetition level j. In some examples, the coverage enhancement step $G_{j,i}$ between repetition levels may be the same as the transmit power step size associated with repetition level i or repetition level j. Additionally or alternatively, the coverage enhancement step $G_{j,i}$ between repetition levels may be determined based on channel conditions determined from a signal received at the UE 115-a (e.g., RSRP, etc.). As shown by the random access procedure 310, the UE 115-a may determine that a transmit power for the first random access request 330-c of the second random access request sequence 320-b should be higher than the transmit power of the last random access request 330-b of the first random access request sequence 320-a.

Following the first random access request 330-c, subsequent random access requests 330 of the second random access request sequence 320-b may be transmitted at increasing transmit power levels. For example, the transmit power for the second random access request 330-d and the third random access request 330-e of the second random access request sequence 320-b may be increased by transmit power step size 325-b. The transmit power step size 325-b may be determined as previously described with respect to transmit power step size 325-a (e.g., from a transmission power parameter, based on a repetition level, based on channel conditions, etc.).

If the UE 115-a does not receive a random access response in response to one of the random access requests 330 of the second random access request sequence 320-b, the random access request procedure 310 may proceed with a third random access request sequence 320-c. For example, the UE 115-a may again identify a repetition level associated with an increased number of redundant transmissions (e.g., four random access request transmissions 340 for each random access request 330 in the third random access request sequence 320-c).

As shown in the third random access request sequence 320-c, the UE 115-a may determine that a transmit power for the first random access request 330-f of the third random access request sequence 320-c should be lower than the transmit power of the last random access request 330-e of the first random access request sequence 320-a. In other examples, the UE 115-a may determine that the transmit power for the first random access request 330-f of the third random access request sequence 320-c should be equal to the transmit power of the last random access request 330-e of the first random access request sequence 320-a (not shown).

Following the first random access request 330-f of the third random access request sequence 320-c, subsequent random access requests 330 of the third random access request sequence 320-c may be transmitted at increasing transmit power levels. For example, the transmit power for the second random access request 330-g of the third random access request sequence 320-c may be increased by transmit power step size 325-c. As for the third random access request 330-h, the UE 115-a may determine that adding the transmit power step size 325-c to the transmit power used by the second random access request 330-g may exceed a maximum transmit power 350. In various examples, the maximum transmit power 350 may be a maximum transmit power for the UE 115-a or a maximum transmit power associated with random access requests. Thus, the UE 115-a may set the transmit power for the third random access request 330-h equal to the maximum transmit power 350.

If the UE 115-a does not receive a random access response from the base station 105-a in response to random access requests 330 of the third random access request sequence 320-c, the random access request procedure 310 may proceed with a fourth random access request sequence 320-d. For example, the UE 115-a may again identify a repetition level associated with an increased number of redundant transmissions (e.g., six random access request transmissions 340 for each random access request 330 in the fourth random access request sequence 320-d). In some examples, the fourth repetition level may be a highest repetition level configured for and/or allowed for the UE 115-a.

As shown in the fourth random access request sequence 320-c, the UE 115-a may determine that a transmit power for the first random access request 330-f of the third random access request sequence 320-c should be set to the maximum transmit power 350. In some examples the determination to set the transmit power for the random access request 330-i to the maximum transmit power 350 may be made based on the fourth repetition level being a highest repetition level. In some examples the determination to set the uplink transmit power to the maximum transmit power 350 may be based on transmission power parameters determined for the fourth random access request sequence 320-d, where the determination is based on the number of redundant random access request transmissions 340 for each random access request 330 (e.g., six) exceeding a threshold. In some examples the determination may be made based on setting the transmit power of the first random access request 330-i of the fourth random access request sequence 320-d equal to the transmit power of the last random access request 330-h of the preceding random access request sequence 320-c. In various examples, selecting the maximum transmit power 350 (or any other non-incrementing uplink transmit power) for random access requests 330 of a random access request sequence 320 may be accompanied by setting a transmit power step size equal to zero.

Following the first random access request 330-i, subsequent random access requests 330 of the fourth random access request sequence 320-d may be continue to be transmitted at the maximum transmit power. In various examples, random access requests 330 may continue until a random access response is received by the UE 115-a, or the random access request procedure 310 may terminate upon reaching a threshold number of random access request sequences 320, a threshold number of random access requests 330, a threshold number of random access request transmissions 340, or any combination thereof. If the random access request procedure 310 is unsuccessful, the UE 115-a may attempt a new random access request procedure 310, which in some examples may be delayed by a preconfigured amount of time. When a random access procedure 310 is successful (e.g., following the reception of a random access response), a communications link may be established, such as the communications link 125-*a* of FIG. 2.

Figure 4:
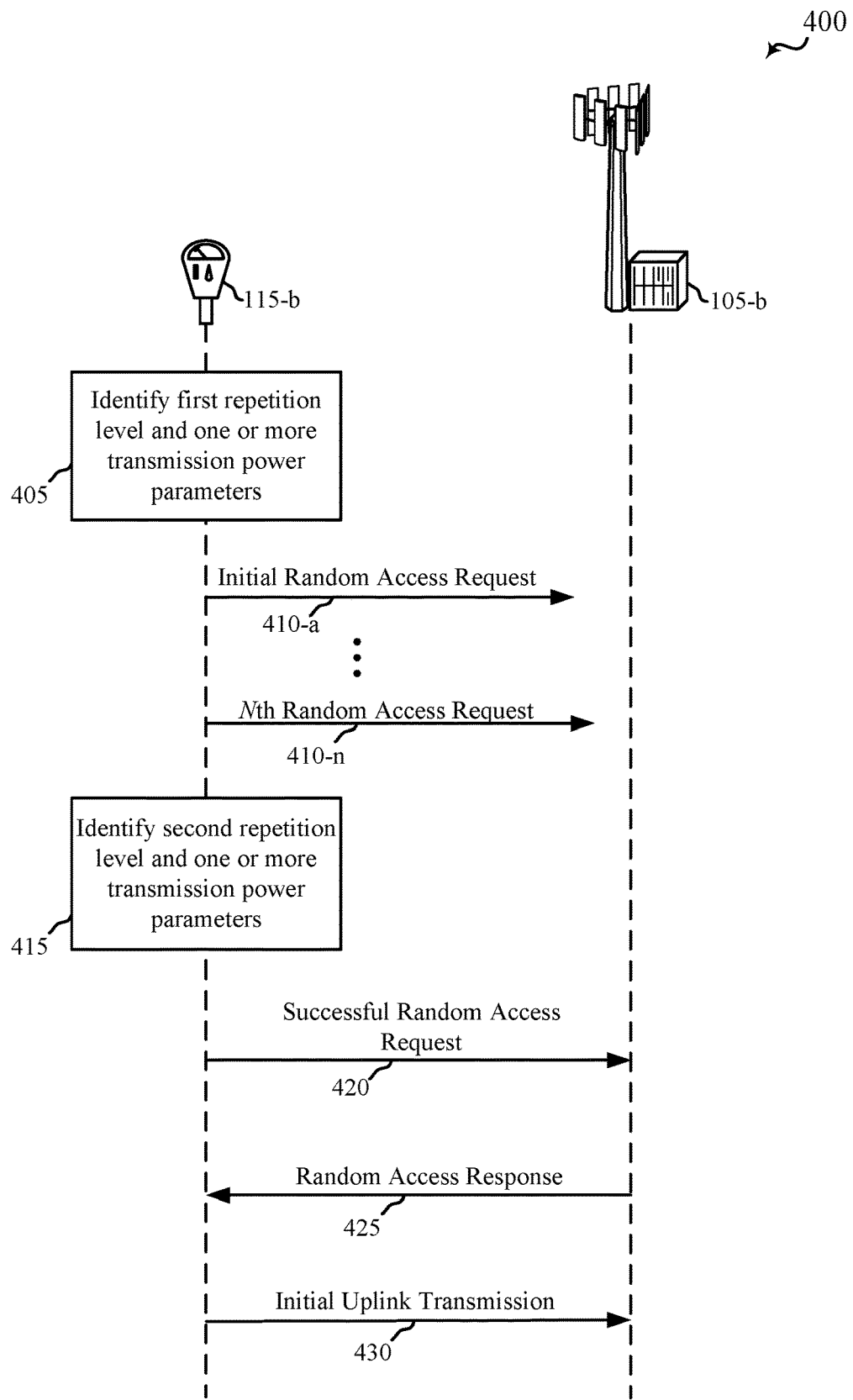
FIG. 4 illustrates an example of a call flow diagram depicting repetition level coverage enhancement techniques, in accordance with aspects of the present disclosure.

FIG. 4 illustrates an example of a call flow diagram 400 depicting repetition level coverage enhancement techniques, in accordance with aspects of the present disclosure. The call flow diagram 400 may illustrate coverage enhancement techniques employed in the wireless communications system 100 or wireless communications subsystem 200 described with reference to FIG. 1 or 2. The call flow diagram 400 includes a UE 115-*b* and a base station 105-*b*, which may be examples of a UE 115 and base station 105 as described with reference to FIG. 1 or 2. In some examples the UE 115-*b* may be an MTC device. The call flow diagram 400 may be an example of a contention-based random access request procedure. For example, the call flow diagram 400 may illustrate a situation in which the UE 115-*b* is transitioning from RRC idle mode to RRC connected mode.

At 405, the UE 115-*b* may identify a first repetition level for a first random access request sequence, and determine one or more transmission power parameters for the first random access request sequence. In some examples the first repetition level and/or the transmission power parameters may be determined, for example, based on channel conditions of uplink or downlink channels. For example, the UE 115-*b* may measure an RSRP from the base station 105-*b*, and the first repetition level and/or the one or more transmission power parameters for random access request transmissions may be determined based on the RSRP.

At 410-*a* the UE 115-*b* may transmit an initial random access request (e.g., a PRACH preamble, etc.) according to the one or more transmission power parameters. For example, the one or more transmission parameters determined by the UE 115-*b* may include an initial transmit power for the first random access request sequence. In some examples, the initial transmit power may be a function of a maximum UE-transmit power value, a path loss value, an RSRP of a received signal, a preamble target power, or any combination thereof. Multiple redundant transmissions of the random access request at 410-*a* may be transmitted according to the first repetition level, such as when the first repetition level provides for bundling of transmissions for coverage enhancement purposes.

In some examples, the first repetition level may be configured for transmit power ramp-up, which may be used by the UE 115-*b* to increase power in subsequent random access requests at the first repetition level based on a first transmit power step size. For example, if the UE 115-*b* does not receive a response (e.g., a random access response, etc.) to the initial random access request at 410-*a*, the UE 115-*b* may attempt subsequent random access requests and determine if a random access response is received, up to an Nth random access request at 410-*n*.

After some number of attempts (N attempts in the example of FIG. 4), the UE 115-*b* may switch to a higher repetition level. For example, at 415 the UE 115-*b* may identify a second repetition level and determine one or more transmission power parameters for the second repetition level. In some examples, the second repetition level may include an increased number of redundant transmissions for each random access request, and the second repetition level may also include an increased number of random access requests relative to the first repetition level. In some examples, the transmission power parameters for the second repetition level may include an initial transmit power for the second repetition level, which may be determined based at least in part on the first repetition level, a transmit power of the first repetition level, or any combination thereof. In examples where a transmit power ramp-up is used in the first repetition level, the transmit power for the initial attempt at the second repetition level may be based on the latest transmit power from the first repetition level.

In some examples, the transmit power of a last random access request at the first repetition level may be a maximum transmit power (e.g., a maximum transmit power for the UE 115-*c*, a maximum transmit power associated with random access requests, etc.), in which case the transmit power for an initial random access request at the second repetition level may be set to be the maximum transmit power. In some examples, the transmit power for an initial random access request at the second repetition level may be set as the maximum transmit power based on the failure of previous random access attempts. In some examples, the transmit power for an initial random access request at the second repetition level may be set to be the transmit power of the last random access request at the first repetition level, and a number of redundant repetitions of random access requests may be increased. In even further examples, the transmit power for an initial random access request at the second repetition level may be determined as a function of the power of the latest random access attempt, the number of redundant transmissions of the first repetition level, and the number of redundant transmissions of the second repetition level.

For example, if a coverage enhancement of 3 dB is desired between the first repetition level and the second repetition level, such an enhancement may be achieved through increased transmit power, increased number of redundant transmissions, or a combination thereof. Thus, in this example, if the second repetition level may be configured for twice as many redundant transmissions of random access requests as the first repetition level, the 3 dB increase may be achieved through the additional redundant transmissions at the second repetition level. If, in another example, the second repetition level provides five times as many redundant transmissions as the first repetition level, and a 3 dB increase is desired, a transmit power level associated with the second repetition level could be determined as the last transmit power at the first repetition level adjusted by $-10*\log_{10}(5/2)$ dB. Of course, these examples are provided for discussion and explanation only, and various other examples may be applied when power ramp-up step sizes are a different value.

In some examples a substantially uniform increase of resources between repetition levels and/or between random access attempts within a repetition level may be provided, and resources for such increases may come from a combination of power ramp-up and repetition level increase. In certain examples, a number of repeated random access requests associated with the first repetition level is more than one, and a number of repeated random access requests associated with the second repetition level is one, thus providing for relatively faster allocation of resources in the event that the random access requests after the first repetition level continue to fail.

At 420, a successful random access request may be sent at the second repetition level, although it will be readily understood that higher repetition levels may be used in certain cases. In response to the successful random access request at 420, the UE 115-*b* may receive from the base station 105-*c* a random access response (e.g., a PDSCH message, etc.) at 425. At 430 the UE 115-*b* may then reply with an initial uplink transmission, such as a layer 3 message on PUSCH. The initial uplink power (e.g., the power of the initial uplink transmission at 430) may be determined based at least in part on a repetition level, in some examples.

Figure 5:
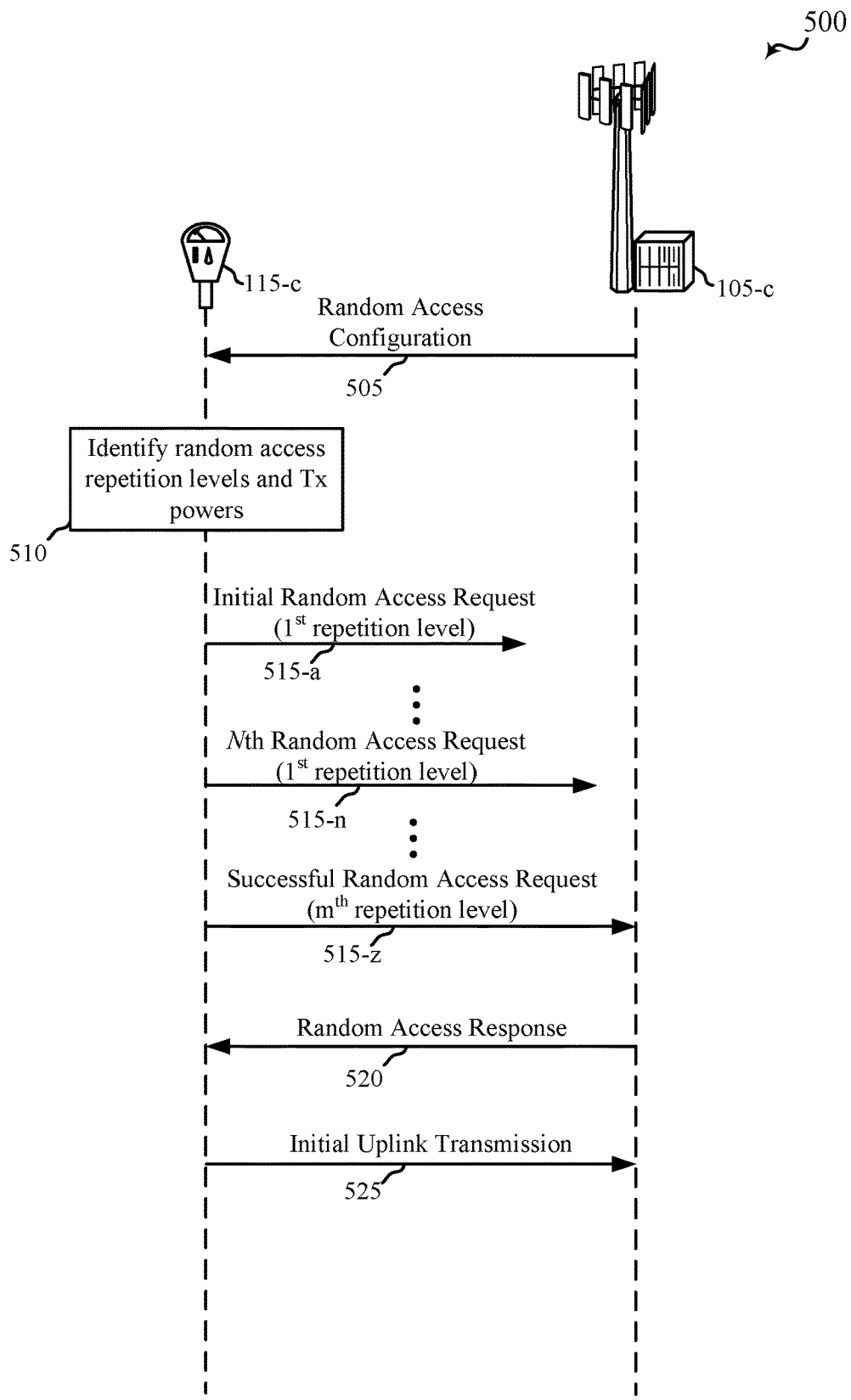
FIG. 5 illustrates an example of a call flow diagram depicting repetition level coverage enhancement techniques, in accordance with aspects of the present disclosure.

FIG. 5 illustrates an example of a call flow diagram 500 depicting repetition level coverage enhancement techniques, in accordance with aspects of the present disclosure. The call flow diagram 500 may illustrate uplink power control coverage enhancement techniques employed in the wireless communications system 100 or wireless communications subsystem 200 described with reference to FIG. 1 or 2. The call flow diagram 500 includes a UE 115-*c* and a base station 105-*c*, which may be examples of a UE 115 and base station 105 as described with reference to FIG. 1 or 2. In some examples the UE 115-*c* may be an MTC device. The call flow diagram 500 may be an example of a contention-based random access request procedure. For example, the call flow diagram 500 may illustrate a situation in which the UE 115-*c* is transitioning from RRC idle mode to RRC connected mode.

At 505 the UE 115-*c* may receive a random access configuration. For example, the random access configuration may include a configuration message received by way of a PDCCH or PDSCH transmission from base station 105-*c*. The random access configuration received at 505 may indicate, for example, one or more transmission power parameters for use in determining transmit power for one or more random access request transmissions.

At 510, the UE 115-*c* may identify one or more random access repetition levels and one or more transmit powers for random access requests at the one or more repetition levels. For example, the UE 115-*c* may identify a first repetition level and a first transmit power for transmissions at the first repetition level, and may identify a second repetition level and a second transmit power for transmissions at a second repetition level. In some examples, the second or higher transmit powers may be based at least in part on the first repetition level, the first transmit power, and the one or more transmit power step sizes.

For example, transmit power step sizes may include a first transmit power step size for the second transmit power relative to the first transmit power level, and a second transmit power step size for a third transmit power relative to the second transmit power level (e.g., a power ramp-up step size associated with the first repetition level being 2 dB and a power ramp-up step size associated with the second repetition level being 3 dB, etc.). In other examples, when the UE 115-*c* moves to the next higher repetition level, the transmit power for the next higher repetition level may be set to equal to a maximum transmit power (e.g., a maximum transmit power for the UE 115-*c*, a maximum transmit power associated with random access requests, etc.). In some examples, the one or more transmit power step sizes may be respectively used for successive random access requests within each respective repetition level. That is, a first transmit power step size may be used for successive random access requests of the first repetition level, while a second transmit power step size may be used for successive random access requests of the second repetition level.

At 515-*a* the UE 115-*c* may transmit an initial random access request (e.g., a PRACH preamble, etc.) at a first transmit power for the first repetition level. As previously described, the first transmit power and the first repetition level may be based on channel conditions or RSRP, in some examples. As discussed above, in some examples the initial random access request may include multiple redundant random access preamble transmissions at 515-*a* if the first repetition level provides for bundling of transmissions for coverage enhancement. In the example of FIG. 5, if the UE 115-*c* does not receive a response to the initial random access request, the UE 115-*c* may attempt subsequent random access requests and determine if a random access response is received, up to an Nth random access request at the first repetition level at 515-*n*. After some number of attempts (N attempts in the example of FIG. 5), the UE 115-*c* may switch to a higher repetition level. As discussed above, higher repetition levels may include an increased number of redundant transmissions within each random access request, increased transmit power, or a combination thereof. For example, the UE 115-*c* may transmit a successful random access request according to an mth repetition level at 515-*z*.

With continuing reference to FIG. 5, the successful random access request may be sent at a second or higher repetition level at 515-*z*. In response to the successful random access request, the UE 115-*c* may receive from the base station 105-*c* a random access response (e.g., a PDSCH message, etc.) at 520. The UE 115-*c* may then reply with an initial uplink transmission at 525, such as a layer 3 message on a PUSCH. The initial uplink power (e.g., the power of the initial uplink transmission at 425) may be determined based at least in part on the repetition level of the successful random access request of 515-*z*, in some examples.

Figure 6:
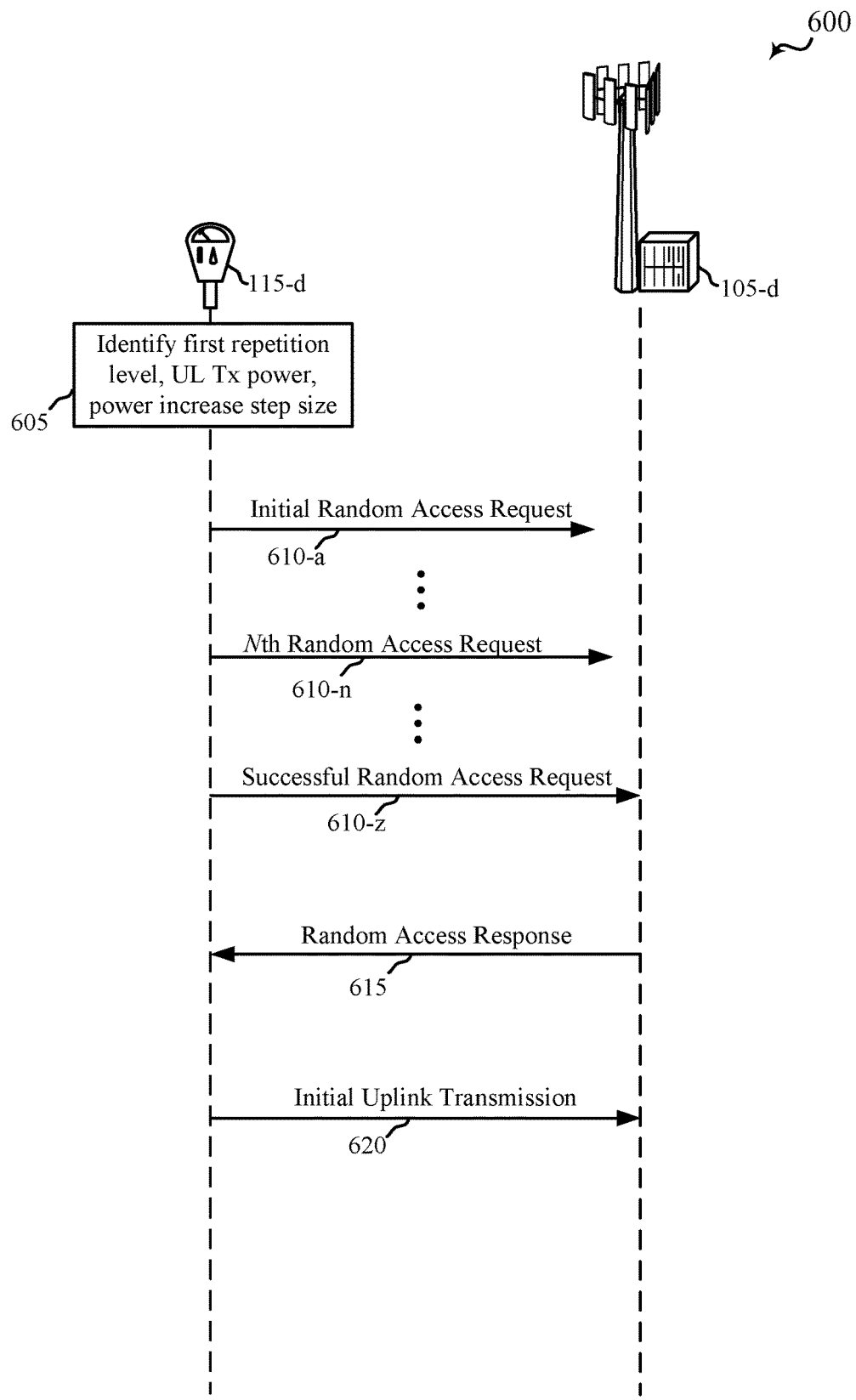
FIG. 6 illustrates an example of a call flow diagram depicting repetition level coverage enhancement techniques, in accordance with aspects of the present disclosure.

FIG. 6 illustrates an example of a call flow diagram 600 depicting repetition level coverage enhancement techniques, in accordance with aspects of the present disclosure. The call flow diagram 600 may illustrate uplink power control coverage enhancement techniques employed in the wireless communications system 100 or wireless communications subsystem 200 described with reference to FIG. 1 or 2. The call flow diagram 600 includes a UE 115-*c* and a base station 105-*c*, which may be examples of a UE 115 and base station 105 as described with reference to FIG. 1 or 2. In some examples the UE 115-*c* may be an MTC device. The call flow diagram 600 may be an example of a contention-based random access request procedure. For example, the call flow diagram 600 may illustrate a situation in which the UE 115-*c* is transitioning from RRC idle mode to RRC connected mode.

At 605 the UE 115-*d* in this example may identify a first repetition level, a first transmit power for a random access request, and a transmit power increase step size for successive random access request transmissions. In some examples, the UE 115-*d* may identify a maximum number of random access requests to be transmitted at the first repetition level, which may be based at least in part on the first transmit power or the transmit power increase step size, and a maximum transmit power (e.g., a maximum transmit power for the UE 115-*c*, a maximum transmit power associated with random access requests, etc.). As previously described, the first transmit power and the repetition level may be based on channel conditions or RSRP, in some examples. The UE 115-*d* may then perform a random access request sequence based on the identified information.

At 610-*a* the UE 115-*d* may transmit an initial random access request (e.g., transmission of one or more PRACH preambles, etc.) at a first transmit power, according to the first repetition level. As discussed above, multiple redundant transmissions of the initial random access request may be transmitted at 610-*a* if the first repetition level provides for bundling of transmissions for coverage enhancement purposes, for example. If the UE 115-*d* does not receive a random access response to the initial random access request, the UE 115-*d* may again attempt subsequent random access requests and determine if a random access response is received, up to an Nth PRACH preamble transmission according to the first repetition level at 610-*n*.

After some number of attempts (N attempts in the example of FIG. 6), the UE 115-*d* may switch to a higher repetition level. As previously described, higher repetition levels may include an increased number of redundant transmissions for each random access request, increased transmit power, or a combination of both, for random access requests subsequent to the first repetition level. At 610-*z* the UE 115-*d* may transmit a successful random access request according to the higher repetition level.

For example, the UE 115-*d* may start a random access request sequence with a repetition level one, which may be configured to include three random access requests. If a random access response is not received during repetition level one, and the last transmit power of a last random access request transmission according to repetition level one is 20 dBm, the UE may then attempt random access requests according to a higher repetition level, such as a random access request sequence having five redundant transmissions of the random access requests, using a same transmit power (20 dBm). If a random access response still is not received, assuming a power ramp-up step size of 3 dB, the UE may transmit another random access request according to the same repetition level as the previous random access request with a higher transmit power of 23 dBm. If 23 dBm is the maximum transmit power, and a random access response still is not received, a subsequent random access request may be transmitted according to a higher repetition level.

In some examples, the transmit power increase step size may be a preconfigured step size for each successive random access request transmission. The configuration may be received, for example, in a configuration message from base station 105-*d*. In some examples, a maximum number of random access requests for a particular repetition level may be based on a parameter configured semi-statically.

The successful random access request at 610-*z* may be sent at a second or higher repetition level. In response to the successful random access request, the UE 115-*d* may receive a random access response (e.g., a PDSCH message, etc.) from the base station 105-*d* at 615. The UE 115-*d* may then reply with an initial uplink transmission at 620, which may include a layer 3 message on PUSCH. The initial uplink power (e.g., the power of the initial uplink transmission) may be determined based at least in part on the repetition level associated with the successful random access request of 610-*z*, in some examples.

Figure 7:
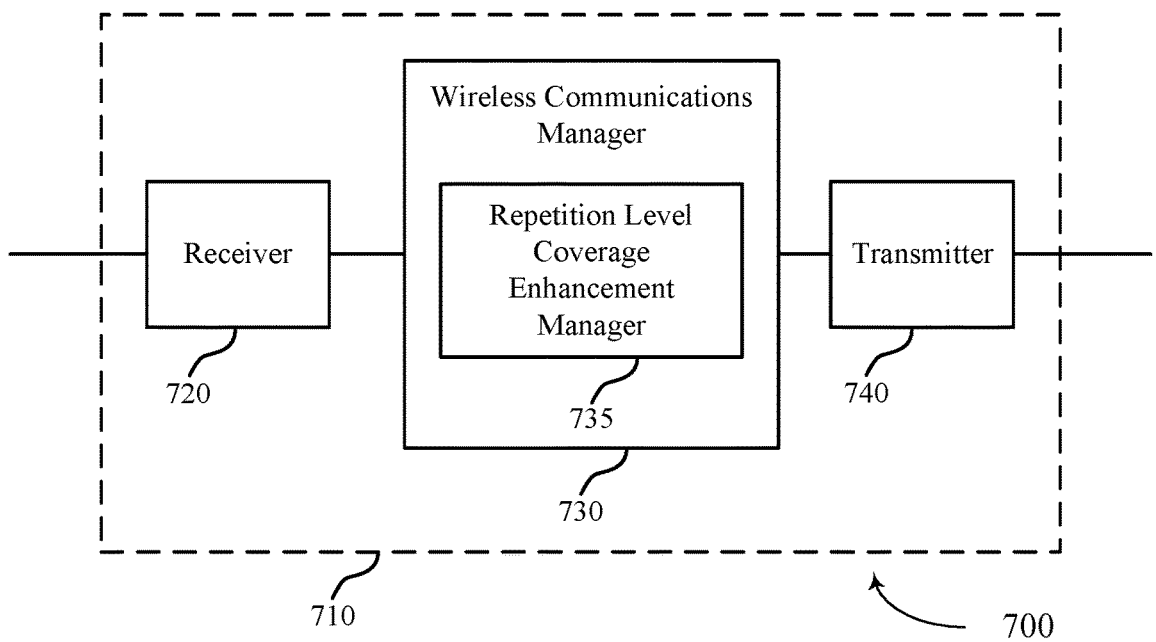
FIG. 7 shows a block diagram of a wireless communications device configured for repetition level coverage enhancement techniques, in accordance with aspects of the present disclosure.

FIG. 7 shows a block diagram 700 of a wireless communications device 710 configured for repetition level coverage enhancement, in accordance with aspects of the present disclosure. Wireless communications device 710 may be an example of aspects of a UE 115 described with reference to FIGS. 1-6. Wireless communications device 710 may include a receiver 720, a wireless communications manager 730, and a transmitter 740. Wireless communications device 710 may also include a processor. Each of these components may be in communication with each other.

The receiver 720 may receive information such as packets, user data, or control information associated with various information channels (e.g., control channels, data channels, and information related to repetition level coverage enhancement, time domain bundling for MTC devices, etc.). In some examples, the receiver 720 may receive (e.g., in a DL control channel, etc.) a configuration for random access repetition levels, which may include various transmission power parameters as described herein. The receiver 720 may also be configured to receive random access responses from a base station, in response to random access requests from the wireless communications device 710. Information may be passed on to the wireless communications manager 730, and to other components of wireless communications device 710.

The wireless communications manager 730 may manage various aspects of wireless communications device 710. For example, the wireless communications manager 730 may include a repetition level coverage enhancement manager 735, configured to manage various aspects of repetition level coverage enhancement techniques described herein. For example, the repetition level coverage enhancement manager 735 may identify repetition levels and determine one or more transmission power parameters associated with transmitting random access requests. In some examples, the repetition level coverage enhancement manager 735 may determine transmission power parameters based on an uplink transmit power of a previous random access sequence at a previous repetition level. Additionally or alternatively, in some examples the repetition level coverage enhancement manager 735 may interpret a configuration received by the receiver 720, identify a repetition level for a random access request sequence, and determine an uplink transmit power for a random access request of the random access request sequence based on the interpreted configuration. In some examples the wireless communications manager 730 may perform operations related to MTC communications described above with reference to FIGS. 1-5

The transmitter 740 may transmit signals received from other components of the wireless communications device 710. For example, the transmitter 740 may be configured to transmit random access requests to be received by a base station 105 serving the wireless communications device 710, which may include repetition level coverage enhancement techniques as described herein. In some examples, the transmitter 740 may be collocated with a receiver in a transceiver module. For example, the transmitter 740 may be an example of aspects of the UE transceiver(s) 1035 and/or antenna(s) 1040 described with reference to FIG. 10.

Figure 8:
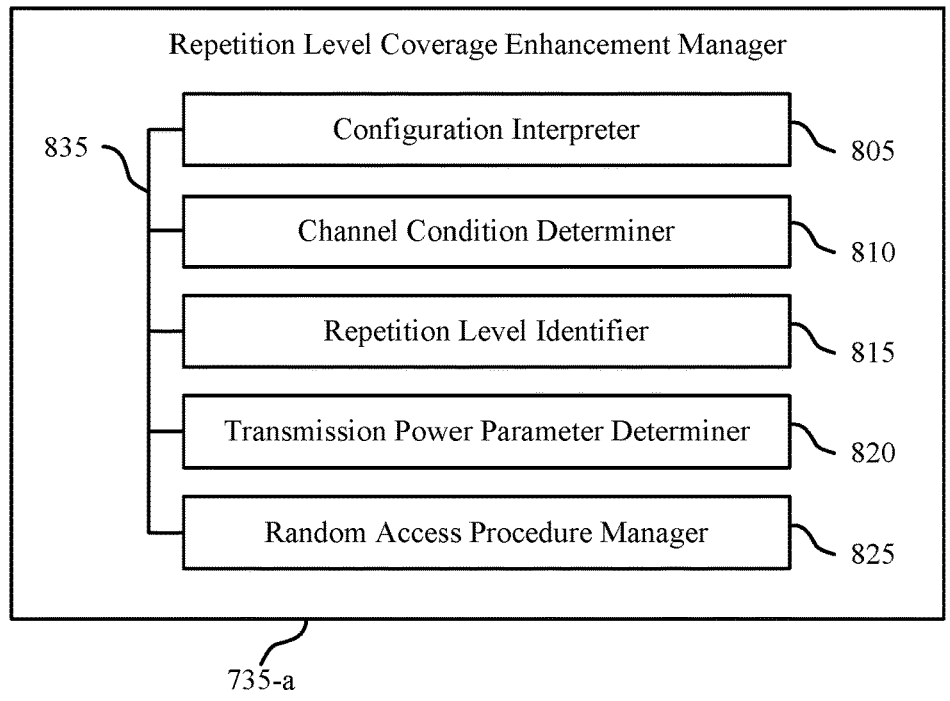
FIG. 8 shows a block diagram of a repetition level coverage enhancement manager configured for repetition level coverage enhancement techniques, in accordance with aspects of the present disclosure.

FIG. 8 shows a block diagram 800 of a repetition level coverage enhancement manager 735-*a* configured for repetition level coverage enhancement techniques, in accordance with aspects of the present disclosure. The repetition level coverage enhancement manager 735-*a* may be an example of aspects of repetition level coverage enhancement manager 735 described with reference to FIG. 7. Repetition level coverage enhancement manager 735-*a* may include any one or more of a configuration interpreter 805, a channel condition determiner 810, a repetition level identifier 815, a transmission power parameter determiner 820, or a random access procedure manager 825. Each of these components may be in communication with each other via one or more buses 835.

The configuration interpreter 805 may interpret aspects of a random access request configuration, such as a configuration stored at a wireless communications device (e.g., in memory of a UE 115), or a configuration received via a receiver (e.g., a receiver 720 as described with reference to FIG. 7). In some examples the configuration interpreter 805 may receive, via a receiver, a configuration message indicating one or more transmission power parameters associated with random access procedures. In various examples the transmission power parameters may be related to the repetition levels and/or number of repetitions per level, that may configured at another device (e.g., a base station semi-statically configuring the values). The configuration interpreter 805 may convey such configuration information, for example, the transmission power parameter determiner 820 or the repetition level identifier 815.

The channel condition determiner 810 may be configured to determine channel conditions, such as through RSRP, and may provide information on the channel conditions to other modules to determine, for example, an initial repetition level an uplink transmit power, and/or a transmit power step size for random access request transmissions, as described above with reference to FIGS. 1-5.

The repetition level identifier 815 may identify a repetition level for random access request transmissions, as described above with reference to FIGS. 1-5. In some examples the identification may be made from a plurality of repetition levels, and the identification may be an initial, middle, or last repetition level of a random access request procedure. In some examples, the number of repetitions per level and/or the possible repetition levels may include preconfigured values at the repetition level coverage enhancement manager (e.g., stored in memory), and the repetition level identifier 815 determines a level and/or repetition number from the preconfigured values. In other examples, repetition levels and/or numbers of repetitions per level are configurable values, which may be determined by the repetition level identifier 815. In still other embodiments, the repetition levels and/or number of repetitions per level are configurable values, and they are configured at another device (e.g., a base station semi-statically configuring the values) and conveyed to the repetition level identifier 815. For example, a receiver module 720 may receive signaling indicative of repetition levels and/or numbers of repetitions for a given repetition level, and the receiver 720 may convey such information to the repetition level identifier 815. Additionally or alternatively, in some examples the repetition level identifier 815 may identify a repetition level based at least in part on channel conditions determined by the channel condition determiner 810.

The transmission power parameter determiner 820 may be configured to determine a transmission power parameter for one or more random access requests of a random access request sequence. In some examples the transmission power parameter determiner 820 may determine a transmit power, which may be based wholly or partially on a repetition level, as described above with reference to FIGS. 1-5. For example, the transmission power parameter determiner 820 may be configured to determine an initial uplink power based on one repetition level (e.g., a PRACH repetition level) and it may be configured to determine a subsequent uplink power based on a different repetition level (e.g., a subsequent PRACH repetition level). In some examples the transmission power parameter determiner may determine a transmit power step size for random access requests according to a repetition level. Additionally or alternatively, the transmission power parameter determiner 820 may determine a maximum transmit power, which in various examples may be one or both of a maximum transmit power of a device, or a maximum transmit power associated with random access request transmissions. Additionally or alternatively, in some examples the transmission power parameter determiner 820 may determine a transmission power based at least in part on channel conditions determined by the channel condition determiner 810.

Where included in a repetition level coverage enhancement manager 735-*a*, the random access procedure manager 825 may manage aspects of random access procedures as described herein. For example, the random access procedure manager 825 may identify random access request transmissions (e.g., PRACH preambles, etc.) to be transmitted as part of a random access request procedure. In some examples the random access procedure manager may manage parameters such as a number of repetition levels in a random access request procedure, a number of random access requests in a random access request sequence, a number of redundant transmissions of random access requests, and/or transmit powers for each random access request transmission, such as those parameters described with reference to FIG. 3. For some random access requests, the random access procedure manager 825 may set a transmit power to a maximum transmit power, which in various examples may be a maximum transmit power of a device, or a maximum transmit power associated with random access request transmissions. In some examples, the random access procedure manager 825 may determine if a random access response has been received via a receiver (e.g., receiver 720 as described with reference to FIG. 7, etc.), as described above with reference to FIGS. 1-5. In some examples the random access procedure manager 825 may be configured to determine resource sets for random access requests as described above with reference to FIGS. 1-5, such as determining repetition level resources for PRACH transmissions.

The components of a wireless communications device 710 as described with reference to FIG. 7, and/or a repetition level coverage enhancement manager 735 described with reference to FIG. 7 or 8 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 9:
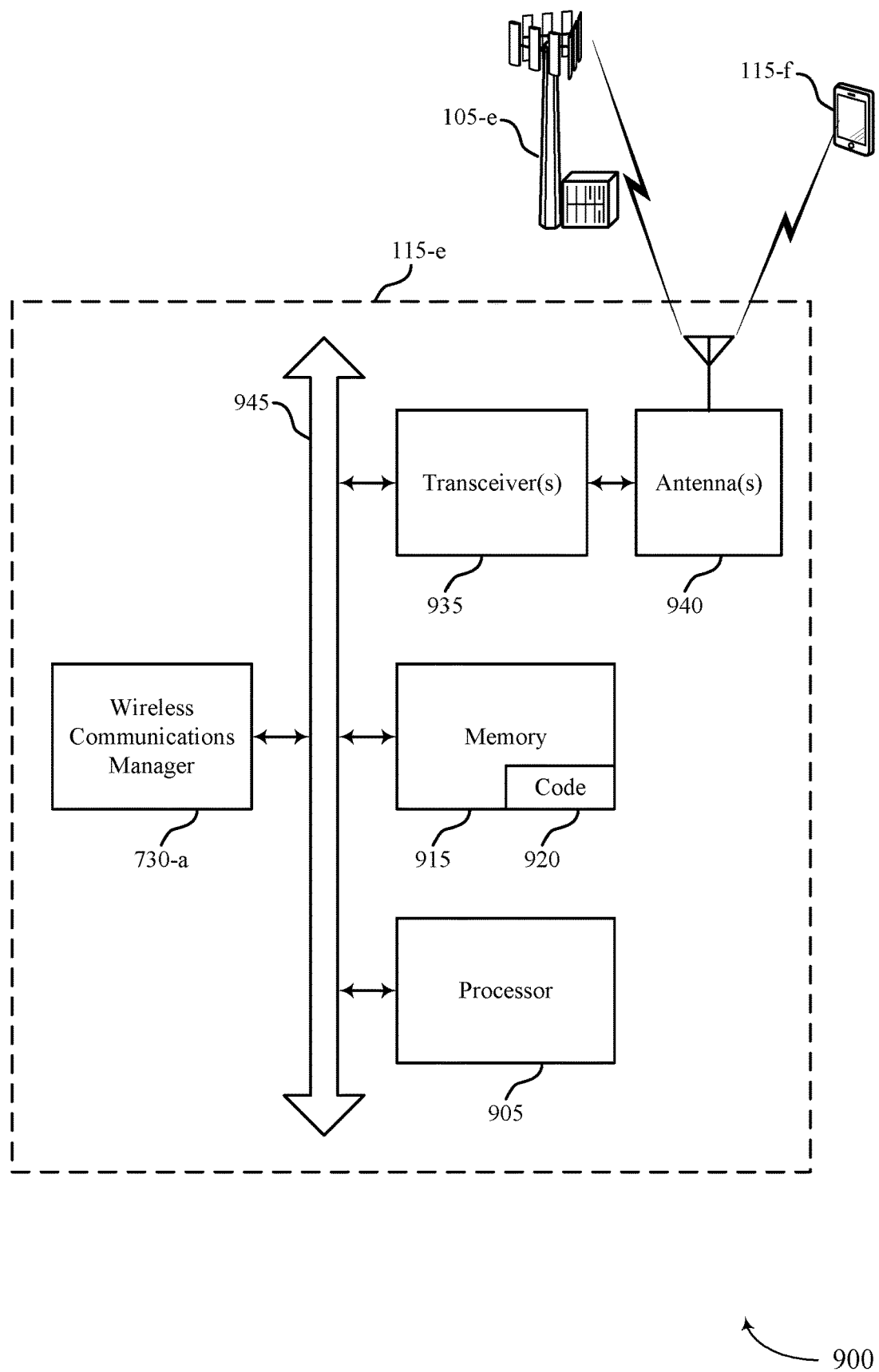
FIG. 9 illustrates a system including a UE configured for repetition level coverage enhancement techniques, in accordance with aspects of the present disclosure.

FIG. 9 illustrates a system 900 including a UE 115 configured for repetition level coverage enhancements, in accordance with aspects of the present disclosure. UE 115-*e* may be an example of a UE 115 or a wireless communications device 710 described above with reference to FIGS. 1-7. UE 115-*e* may include a wireless communications manager 730-*a*, which may be an example of a wireless communications manager 730 described with reference to FIGS. 6-8. In some examples the wireless communications manager 730-*a* may be configured to perform operations related to MTC communications described above with reference to FIGS. 1-5. UE 115-*e* may also include components for bi-directional voice and data communications including components for transmitting communications and components for receiving communications. For example, UE 115-*e* may communicate bi-directionally with UE 115-*f* or base station 105-*e*.

UE 115-*e* may include a processor 905, memory 915 (including software/firmware code 920), transceiver(s) 935, and one or more antenna(s) 940, each of which may communicate, directly or indirectly, with one another (e.g., via buses 945). The transceiver(s) 935 may communicate bi-directionally, via the antenna(s) 940 or wired or wireless links, with one or more networks, as described above. For example, the transceiver(s) 935 may communicate bi-directionally with a base station 105 or another UE 115. The transceiver(s) 935 may include a modem to modulate the packets and provide the modulated packets to the antenna(s) 940 for transmission, and to demodulate packets received from the antenna(s) 940. While UE 115-*e* may include a single antenna 940, UE 115-*c* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., repetition level coverage enhancement techniques, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an ASIC, etc.)

The wireless communications manager 730-*a* may be configured to perform random access procedures based at least in part on a coverage enhancement setting of the UE 115-*e* as described above with reference to FIGS. 1-8. For example, the wireless communications manager 730-*a* may include a repetition level coverage enhancement manager, such as repetition level coverage enhancement managers 735 described with reference to FIG. 7 or 8. The wireless communications manager 730-*a* may be in communication with other components of the UE 115-*e*, directly or indirectly, over the one or more buses 945. The wireless communications manager 730-*a*, or portions of it, may include a processor, or some or all of the functions of the wireless communications manager 730-*a* may be performed by the processor 905 or in connection with the processor 905.

Figure 10:
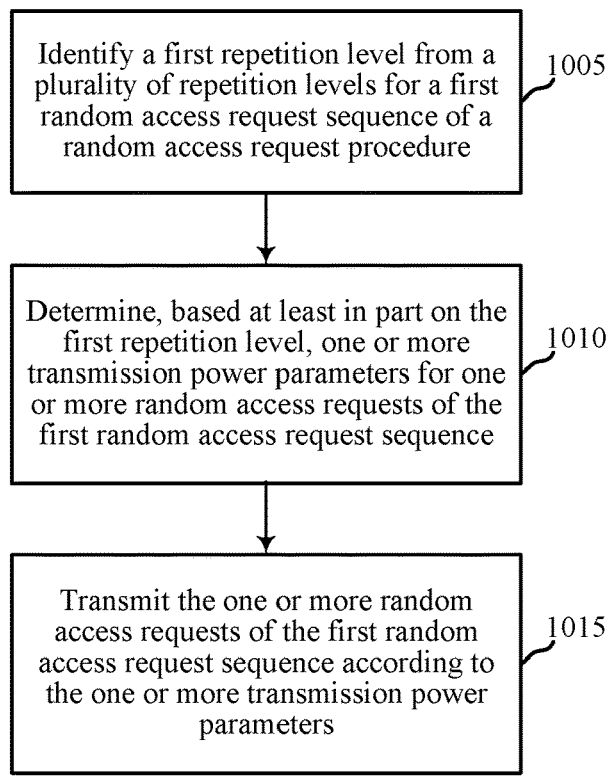
FIG. 10 shows a flowchart illustrating a method for wireless communication employing repetition level coverage enhancement techniques, in accordance with aspects of the present disclosure.

FIG. 10 shows a flowchart illustrating a method 1000 for wireless communication employing repetition level coverage enhancement techniques, in accordance with aspects of the present disclosure. The operations of method 1000 may be implemented by a wireless communications device (e.g., a UE 115, or a wireless communications device 710) or its components as described with reference to FIGS. 1-9. For example, the operations of method 1000 may be performed by a wireless communications manager 730 having a repetition level coverage enhancement manager 735 as described with reference to FIGS. 7-9. In some examples, a wireless communications device may execute a set of codes to control the functional elements of the wireless communications device to perform the functions described below. Additionally or alternatively, the wireless communications device may perform aspects the functions described below using special-purpose hardware.

At block 1005, the method may include identifying a first repetition level from a plurality of repetition levels for a first random access request sequence of a random access request procedure, as described above with reference to FIGS. 1-6. In some examples, the operations of block 1005 may be performed by a repetition level identifier 815 as described with reference to FIG. 8.

At block 1010, the method may determining, based at least in part on the first repetition level, one or more transmission power parameters for one or more random access requests of the first random access request sequence, as described above with reference to FIGS. 1-6. In certain examples, the operations of block 1010 may be performed by a transmission power parameter determiner 820 as described with reference to FIG. 8.

At block 1015, the method may include transmitting the one or more random access requests of the first random access request sequence according to the one or more transmission power parameters, as described above with reference to FIGS. 1-6. In some examples, the operations of block 1015 may be performed by a random access procedure manager 825 as described with reference to FIG. 8 in cooperation with a transmitter, such as a transmitter 740 as described with reference to FIG. 7, or transceiver(s) 935 and antenna(s) 940 described with reference to FIG. 9.

Figure 11:
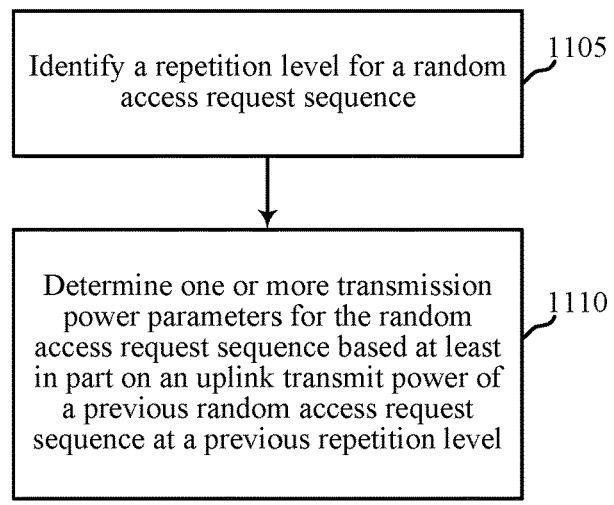
FIG. 11 shows a flowchart illustrating a method for wireless communication employing repetition level coverage enhancement techniques, in accordance with aspects of the present disclosure.

FIG. 11 shows a flowchart illustrating a method 1100 for wireless communication employing repetition level coverage enhancement techniques, in accordance with aspects of the present disclosure. The operations of method 1000 may be implemented by a wireless communications device (e.g., a UE 115, or a wireless communications device 710) or its components as described with reference to FIGS. 1-9. For example, the operations of method 1100 may be performed by a wireless communications manager 730 having a repetition level coverage enhancement manager 735 as described with reference to FIGS. 7-9. In some examples, a wireless communications device may execute a set of codes to control the functional elements of the wireless communications device to perform the functions described below. Additionally or alternatively, the wireless communications device may perform aspects the functions described below using special-purpose hardware.

At block 1105, the method may include identifying a repetition level for a random access request sequence, as described with reference to FIGS. 1-6. In certain examples, the operations of block 1105 may be performed by a repetition level identifier 815 as described with reference to FIG. 8.

At block 1110, the method may include determining one or more transmission power parameters for the random access request sequence based at least in part on an uplink transmit power of a previous random access request sequence at a previous repetition level, as described with reference to FIGS. 1-6. In certain examples, the operations of block 1110 may be performed by a transmission power parameter determiner 820 as described with reference to FIG. 8.

Figure 12:
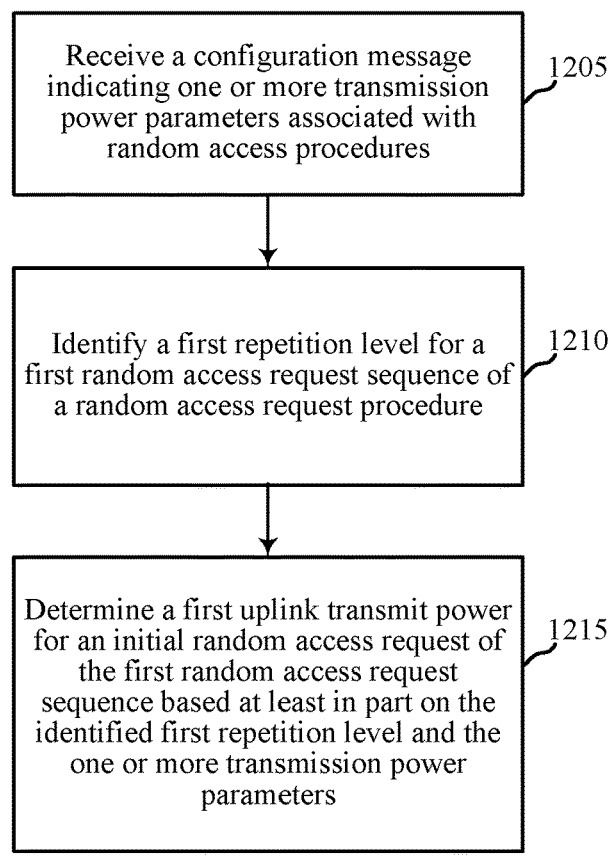
FIG. 12 shows a flowchart illustrating a method for wireless communication employing repetition level coverage enhancement techniques, in accordance with aspects of the present disclosure.

FIG. 12 shows a flowchart illustrating a method 1200 for wireless communication employing repetition level coverage enhancement techniques, in accordance with aspects of the present disclosure. The operations of method 1200 may be implemented by a wireless communications device (e.g., a UE 115, or a wireless communications device 710) or its components as described with reference to FIGS. 1-9. For example, the operations of method 1200 may be performed by a wireless communications manager 730 having a repetition level coverage enhancement manager 735 as described with reference to FIGS. 7-9. In some examples, a wireless communications device may execute a set of codes to control the functional elements of the wireless communications device to perform the functions described below. Additionally or alternatively, the wireless communications device may perform aspects the functions described below using special-purpose hardware.

At block 1205, the method may include receiving a configuration message indicating one or more transmission power parameters associated with random access procedures, as described with reference to FIGS. 1-6. In certain examples, the operations of block 1205 may be performed by a configuration interpreter 805 as described with reference to FIG. 8.

At block 1210, the method may include identifying a first repetition level for a first random access request sequence of a random access request procedure, as described with reference to FIGS. 1-6. In certain examples, the operations of block 1210 may be performed by a repetition level identifier 815 as described with reference to FIG. 8.

At block 1215, the method may include determining a first uplink transmit power for an initial random access request of the first random access request sequence based at least in part on the identified first repetition level and the one or more transmission power parameters, as described with reference to FIGS. 1-6. In certain examples, the operations of block 1215 may be performed by a transmission power parameter determiner 820 as described with reference to FIG. 8.

Thus, methods 1000, 1100, and 1200 may provide for repetition level coverage enhancement in a wireless system. It should be noted that methods 1000, 1100, and 1200 describe possible implementation, and that the operations and the steps may be rearranged or otherwise modified such that other implementations are possible. In some examples, aspects from two or more of the methods 1000, 1100, or 1200 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of communication at a wireless communications device, comprising:
    identifying a first repetition level from a plurality of repetition levels for a first random access request sequence of a random access request procedure;
    determining, based at least in part on the first repetition level, a first initial power for the first random access request sequence and a first transmit power step size for the first random access request sequence that is not equal to zero;
    transmitting at least one random access request of the first random access request sequence according to the first initial power and the first transmit power step size;
    identifying a second repetition level for a second random access request sequence of the random access request procedure based at least in part on determining that a random access response was not received in response to the first random access request sequence;
    determining that the second repetition level is a highest repetition level;
    determining, based at least in part on the determining that the second repetition level is the highest repetition level, a second initial power for the second random access request sequence and a second transmit power step size for the second random access request sequence that is equal to zero; and
    transmitting at least one random access request of the second random access request sequence according to the second initial power.

2. The method of claim 1, further comprising:
    determining channel conditions based at least in part on a signal received at the wireless communications device;
    wherein the identifying the first repetition level for the first random access request sequence is based at least in part on the determined channel conditions.

3. The method of claim 1, further comprising:
    determining channel conditions based at least in part on a signal received at the wireless communications device;
    wherein the determining the first initial power is based at least in part on the determined channel conditions.

4. The method of claim 1, wherein the determining the second initial power comprises:
    determining the second initial power to be equal to a maximum transmit power based at least in part on the determining that the second repetition level is the highest repetition level.

5. The method of claim 1, further comprising:
    identifying a maximum number of random access requests to be transmitted in the first random access request sequence based at least in part on a maximum uplink transmit power of the wireless communications device; and
    performing the first random access request sequence based at least in part on the identified maximum number of random access requests.

6. An apparatus for communication at a wireless communications device, comprising:
    means for identifying a first repetition level from a plurality of repetition levels for a first random access request sequence of a random access request procedure;
    means for determining, based at least in part on the first repetition level, a first initial power for the first random access request sequence and a first transmit power step size for the first random access request sequence that is not equal to zero;
    means for transmitting at least one random access request of the first random access request sequence according to the first initial power and the first transmit power step size;
    means for identifying a second repetition level for a second random access request sequence of the random access request procedure based at least in part on determining that a random access response was not received in response to the first random access request sequence;
    means for determining that the second repetition level is a highest repetition level;
    means for determining, based at least in part on the determining that the second repetition level is the highest repetition level, a second initial power for the second random access request sequence and a second transmit power step size for the second random access request sequence that is equal to zero; and
    means for transmitting at least one random access request of the second random access request sequence according to the second initial power.

7. The apparatus of claim 6, further comprising:
    means for determining channel conditions based at least in part on a signal received at the wireless communications device;
    wherein the means for identifying the first repetition level for the first random access request sequence is operable based at least in part on the determined channel conditions.

8. The apparatus of claim 6, further comprising:
    means for determining channel conditions based at least in part on a signal received at the wireless communications device;
    wherein the means for determining the first initial power is operable based at least in part on the determined channel conditions.

9. The apparatus of claim 6, wherein the means for determining the second initial power comprises:
means for determining the second initial power to be equal to a maximum uplink transmit power based at least in part on the determining that the second repetition level is the highest repetition level.

10. The apparatus of claim 6, further comprising:
means for identifying a maximum number of random access requests to be transmitted in the first random access request sequence based at least in part on a maximum uplink transmit power of the wireless communications device; and
means for performing the first random access request sequence based at least in part on the identified maximum number of random access requests.

11. An apparatus for communication at a wireless communications device, comprising:
a processor;
memory in electronic communication with the processor; and
instructions stored in the memory and executable by the processor to cause the wireless communications device to:
identify a first repetition level from a plurality of repetition levels for a first random access request sequence of a random access request procedure;
determine, based at least in part on the first repetition level, a first initial power for the first random access request sequence and a first transmit power step size for the first random access request sequence that is not equal to zero;
transmit at least one random access request of the first random access request sequence according to the first initial power and the first transmit power step size;
identify a second repetition level for a second random access request sequence of the random access request procedure based at least in part on determining that a random access response was not received in response to the first random access request sequence;
determine that the second repetition level is a highest repetition level;
determine, based at least in part on the determining that the second repetition level is the highest repetition level, a second initial power for the second random access request sequence and a second transmit power step size for the second random access request sequence that is equal to zero; and
transmit at least one random access request of the second random access request sequence according to the second initial power.

12. The apparatus of claim 11, further comprising instructions executable by the processor to cause the wireless communications device to:
determine channel conditions based at least in part on a signal received at the wireless communications device;
wherein the instructions to identify the first repetition level for the first random access request sequence are operable based at least in part on the determined channel conditions.

13. The apparatus of claim 11, further comprising instructions executable by the processor to cause the wireless communications device to:
determine channel conditions based at least in part on a signal received at the wireless communications device;
wherein the instructions to determine the first initial power are operable based at least in part on the determined channel conditions.

14. The apparatus of claim 11, wherein the instructions to determine the second initial power comprise instructions executable by the processor to cause the wireless communications device to:
determine the second initial power to be equal to a maximum uplink transmit power based at least in part on the determining that the second repetition level is the highest repetition level.

15. The apparatus of claim 11, further comprising instructions executable by the processor to cause the wireless communications device to:
identify a maximum number of random access requests to be transmitted in the first random access request sequence based at least in part on a maximum uplink transmit power of the wireless communications device; and
perform the first random access request sequence based at least in part on the identified maximum number of random access requests.

16. A non-transitory computer-readable medium storing code for communication at a wireless communications device, the code comprising instructions executable to:
identify a first repetition level from a plurality of repetition levels for a first random access request sequence of a random access request procedure;
determine, based at least in part on the first repetition level, a first initial power for the first random access request sequence and a first transmit power step size for the first random access request sequence that is not equal to zero;
transmit at least one random access request of the first random access request sequence according to the first initial power and the first transmit power step size;
identify a second repetition level for a second random access request sequence of the random access request procedure based at least in part on determining that a random access response was not received in response to the first random access request sequence;
determine that the second repetition level is a highest repetition level;
determine, based at least in part on the determining that the second repetition level is the highest repetition level, a second initial power for the second random access request sequence and a second transmit power step size for the second random access request sequence that is equal to zero; and
transmit at least one random access request of the second random access request sequence according to the second initial power.

17. The non-transitory computer-readable medium of claim 16, further comprising instructions executable to:
determine channel conditions based at least in part on a signal received at the wireless communications device;
wherein the instructions to identify the first repetition level for the first random access request sequence are operable based at least in part on the determined channel conditions.

18. The non-transitory computer-readable medium of claim 16, further comprising instructions executable to:
determine channel conditions based at least in part on a signal received at the wireless communications device;
wherein the instructions to determine the first initial power are operable based at least in part on the determined channel conditions.

19. The non-transitory computer-readable medium of claim 16, wherein the instructions to determine the first transmit power comprise instructions executable to:
    determine the second initial power to be equal to a maximum transmit power based at least in part on the determining that the second repetition level is the highest repetition level.

20. The non-transitory computer-readable medium of claim 16, further comprising instructions executable to:
    identify a maximum number of random access requests to be transmitted in the first random access request sequence based at least in part on a maximum uplink transmit power of the wireless communications device; and
    perform the first random access request sequence based at least in part on the identified maximum number of random access requests.

* * * * *